United States Patent
Bailey

(10) Patent No.: US 8,329,357 B2
(45) Date of Patent: Dec. 11, 2012

(54) BATTERY HAVING FLUID MANAGER AND SLIDING VALVE WITH FRICTION REDUCTION MEMBERS

(75) Inventor: John C. Bailey, Columbia Station, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 1478 days.

(21) Appl. No.: 11/860,156

(22) Filed: Sep. 24, 2007

(65) Prior Publication Data

US 2009/0081519 A1 Mar. 26, 2009

(51) Int. Cl.
*H01M 8/04* (2006.01)
(52) U.S. Cl. .................. 429/512; 429/407; 429/402
(58) Field of Classification Search ............ 429/53–57, 429/50, 61, 71–72, 82–83, 90, 96, 99–100, 429/110, 112–113, 121–122, 149, 151, 129, 429/152, 156–157, 159, 163–164, 175–178, 429/186, 402–405, 407, 408; 29/623.1–623.5
See application file for complete search history.

(56) References Cited

U.S. PATENT DOCUMENTS

| | | | |
|---|---|---|---|
| 5,079,106 A | 1/1992 | Urry | |
| 5,304,431 A | 4/1994 | Schumm, Jr. | |
| 5,421,874 A | 6/1995 | Pearce | |
| 5,449,569 A | 9/1995 | Schumm, Jr. | |
| 5,541,016 A * | 7/1996 | Schumm, Jr. | 429/402 |
| 5,554,452 A | 9/1996 | Delmolino et al. | |
| 5,641,588 A | 6/1997 | Sieminski et al. | |
| 5,733,676 A | 3/1998 | Dopp et al. | |
| 5,795,667 A | 8/1998 | McKenzie et al. | |
| 5,837,394 A | 11/1998 | Schumm, Jr. | |

(Continued)

FOREIGN PATENT DOCUMENTS

DE 4214877 A1 11/1993

(Continued)

OTHER PUBLICATIONS

Johnson, David ("Fabrication of Silicone-Based Shape Memory Alloy Micro-Actuators", Mat. Res. Soc. Symp. Proc., 1992, vol. 276, pp. 151-160).*

(Continued)

*Primary Examiner* — Barbara Gilliam
*Assistant Examiner* — Maria J Laios
(74) *Attorney, Agent, or Firm* — Russell H. Toye, Jr.

(57) ABSTRACT

A fluid consuming battery (10) is provided with a fluid regulating system (50) for regulating fluid entry into the battery. The battery (10) includes a fluid consuming cell (20) having a cell housing with fluid entry ports for the passage of a fluid into the cell housing. A first fluid consuming electrode and a second electrode are disposed within the cell housing. The fluid regulating system (50) includes a valve having a moving plate (66) disposed adjacent to a fixed plate (62). The moving plate and fixed plate both have fluid entry ports (68, 64) that align in an open valve position and are misaligned in a closed valve position. The fluid regulating system (50) also includes an actuator that may include one or more shape memory alloy (SMA) components (82a, 82b) for moving the moving plate (66) relative to the fixed plate (62) to open and close the valve. In one embodiment, a friction reduction medium (502) employing lubricating oil (69) and a plurality spherical members (500) is disposed between the moving plate (66) and fixed plate (62) to provide enhanced valve operation.

17 Claims, 26 Drawing Sheets

U.S. PATENT DOCUMENTS

| | | |
|---|---|---|
| 6,350,537 B1 | 2/2002 | Pedicni |
| 6,383,674 B1 | 5/2002 | Urry |
| 6,384,574 B1 | 5/2002 | McHugh et al. |
| 6,492,046 B1 | 12/2002 | Payne et al. |
| 6,500,575 B1 | 12/2002 | Shiue et al. |
| 6,558,828 B1 | 5/2003 | Guo |
| 6,641,947 B1 | 11/2003 | Molloy et al. |
| 6,660,418 B1 | 12/2003 | Tinker et al. |
| 6,773,842 B2 | 8/2004 | Liu et al. |
| 6,794,074 B2 | 9/2004 | Vu et al. |
| 6,955,187 B1 | 10/2005 | Johnson |
| 6,981,520 B2 | 1/2006 | Sherman et al. |
| 7,056,617 B2 | 6/2006 | Kelsey et al. |
| 7,708,974 B2 * | 5/2010 | Yadav .................... 423/594.13 |
| 7,816,027 B2 | 10/2010 | Brandon, II |
| 2002/0150814 A1 | 10/2002 | Causton et al. |
| 2003/0049508 A1 | 3/2003 | Iarochenko et al. |
| 2003/0186099 A1 | 10/2003 | Liu et al. |
| 2004/0048121 A1 | 3/2004 | Motupally et al. |
| 2004/0048146 A1 | 3/2004 | Adamson et al. |
| 2004/0159813 A1 | 8/2004 | Sherman et al. |
| 2005/0118469 A1 | 6/2005 | Leach et al. |
| 2005/0136321 A1 | 6/2005 | Bailey |
| 2006/0134510 A1 | 6/2006 | Cabuz |
| 2006/0166079 A1 | 7/2006 | Beerwerth et al. |
| 2006/0257701 A1 | 11/2006 | Schumm, Jr. |
| 2008/0085436 A1 | 4/2008 | Langan et al. |
| 2008/0085443 A1 | 4/2008 | Somerville et al. |
| 2008/0085444 A1 | 4/2008 | Langan et al. |
| 2008/0090135 A1 | 4/2008 | Wu et al. |
| 2008/0096067 A1 | 4/2008 | Langan et al. |
| 2008/0096069 A1 | 4/2008 | Bailey et al. |
| 2008/0096082 A1 | 4/2008 | Langan et al. |
| 2008/0254330 A1 | 10/2008 | Jones et al. |
| 2008/0254340 A1 | 10/2008 | Blakey et al. |
| 2008/0254341 A1 | 10/2008 | Bailey et al. |
| 2008/0254345 A1 | 10/2008 | Broburg et al. |
| 2008/0254346 A1 | 10/2008 | Burstall et al. |
| 2009/0291332 A1 | 11/2009 | Brandon, II |

FOREIGN PATENT DOCUMENTS

| | | |
|---|---|---|
| WO | WO 0109519 | 2/2001 |
| WO | WO 0109520 | 2/2001 |
| WO | WO 0235641 | 5/2002 |

OTHER PUBLICATIONS

Patent Cooperation Treaty (PCT) International Search Report and Written Opinion for Application No. PCT/US2008/010997, filed Sep. 23, 2009, mailed Jun. 5, 2009, European Patent Office, Netherlands.

* cited by examiner

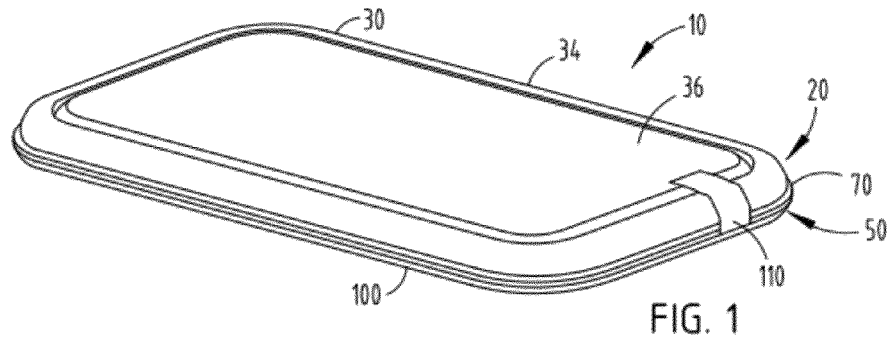
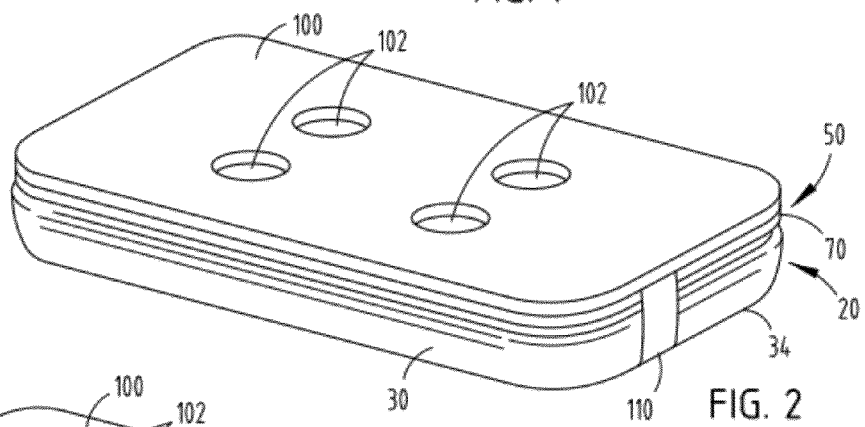
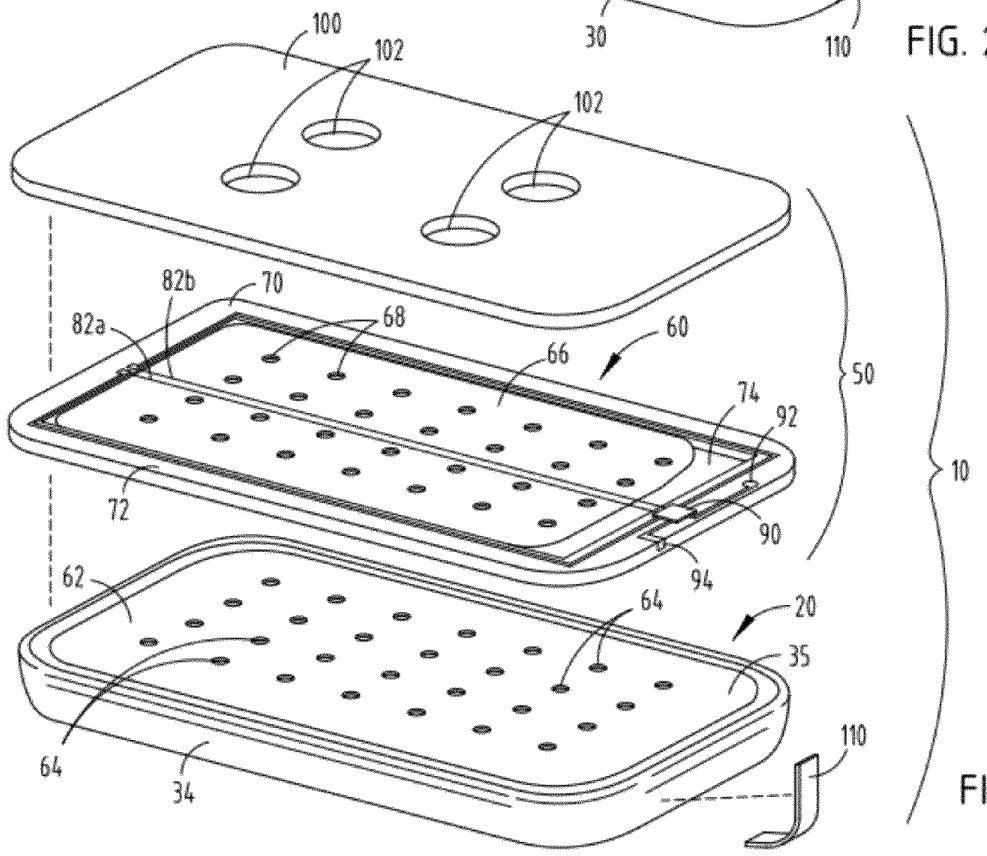

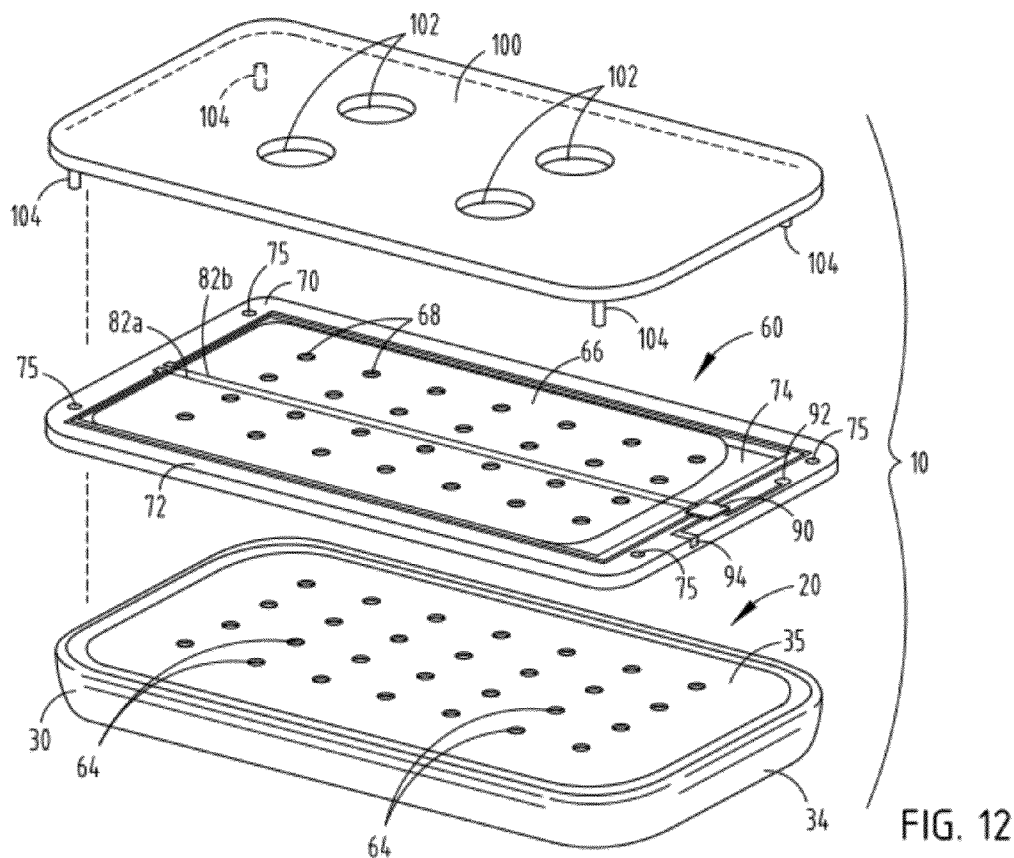
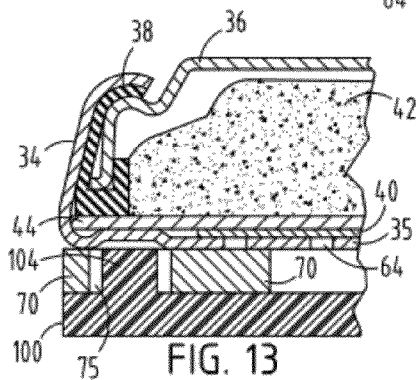
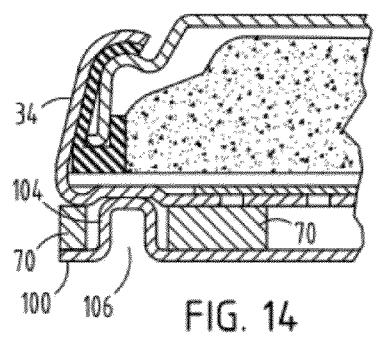
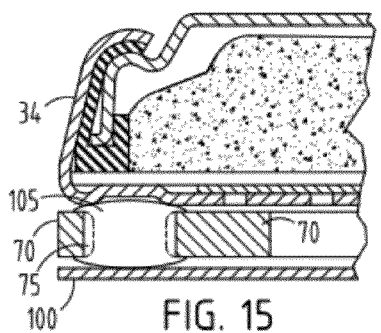
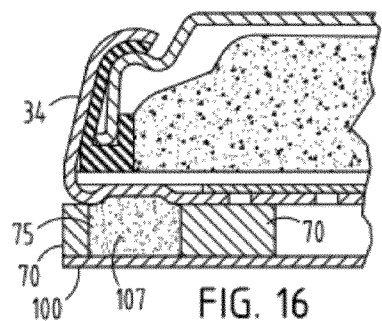

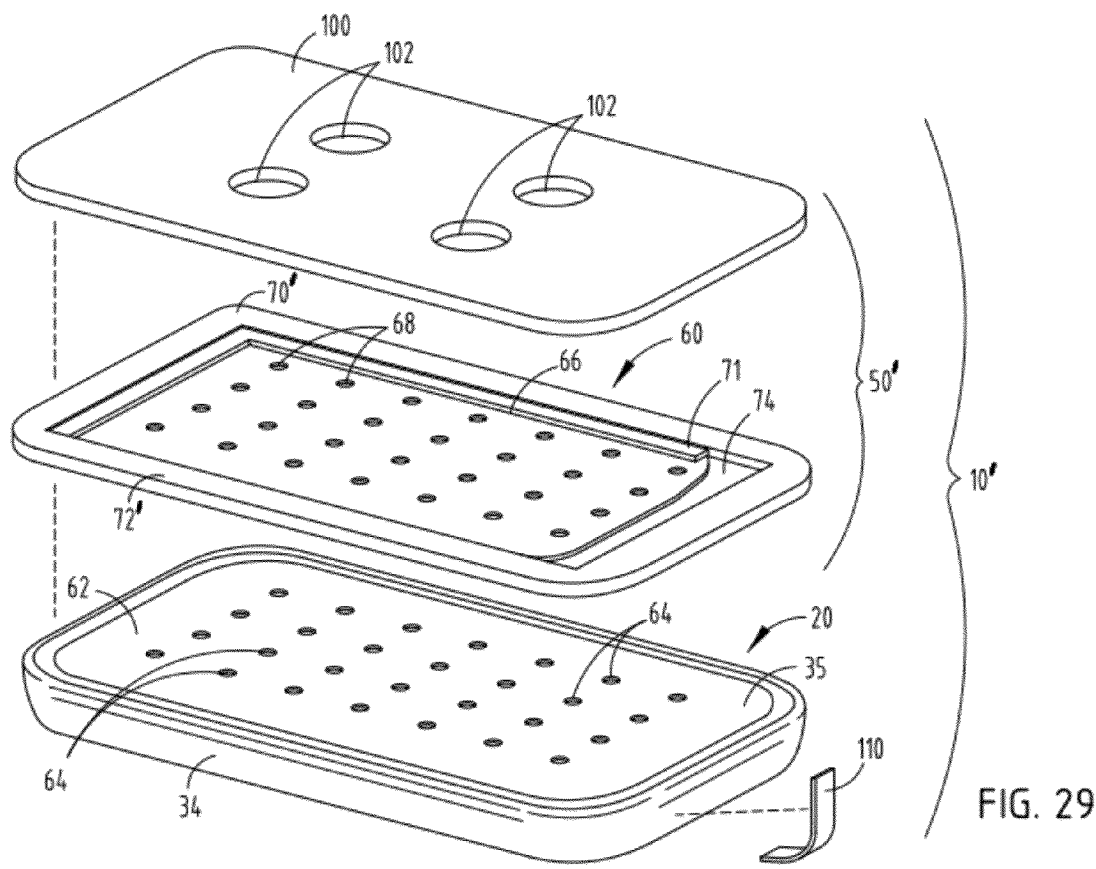
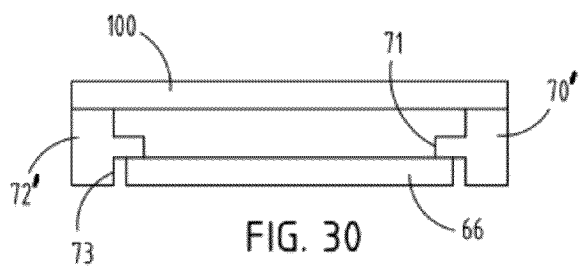
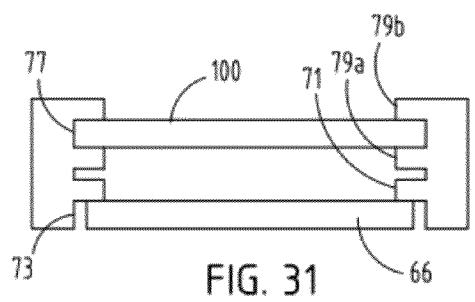

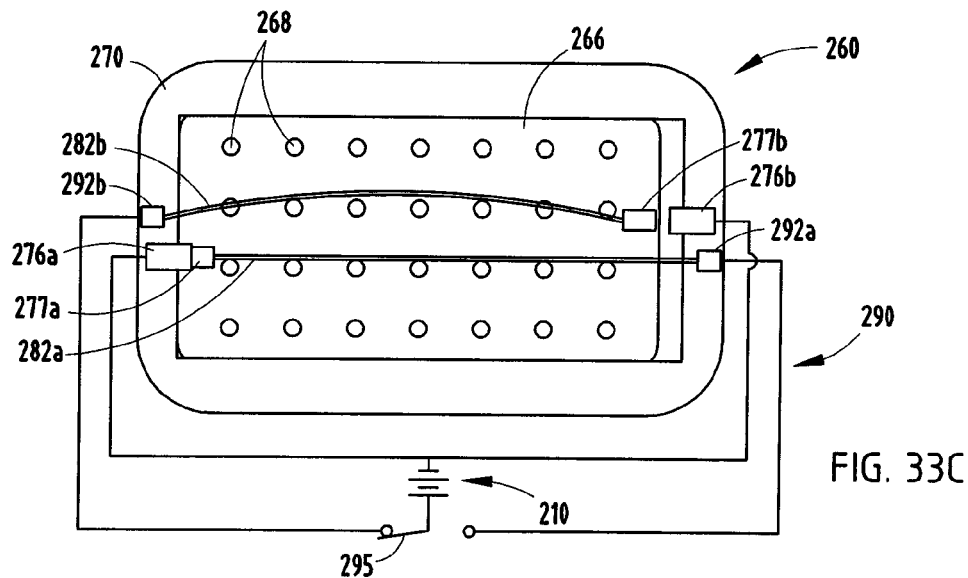
FIG. 33C
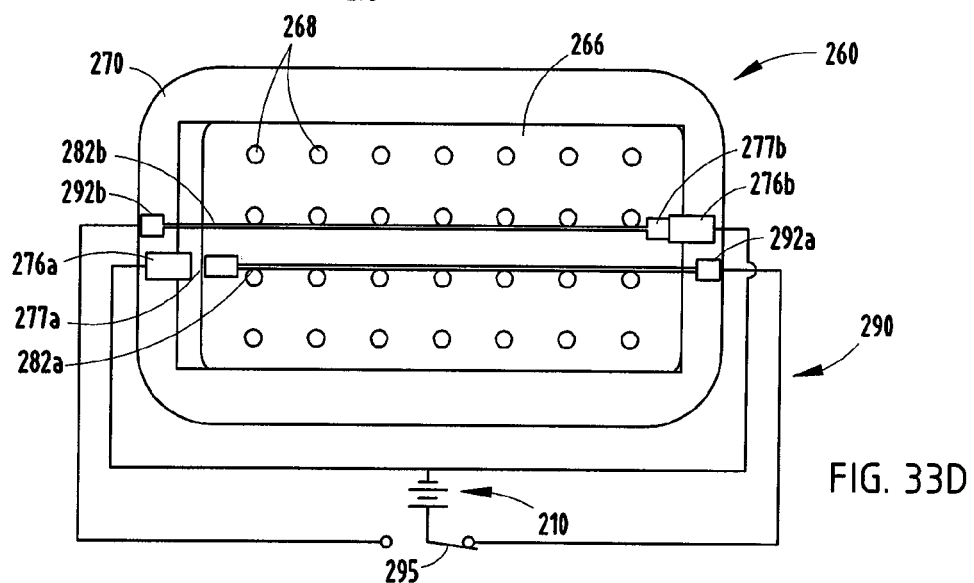
FIG. 33D
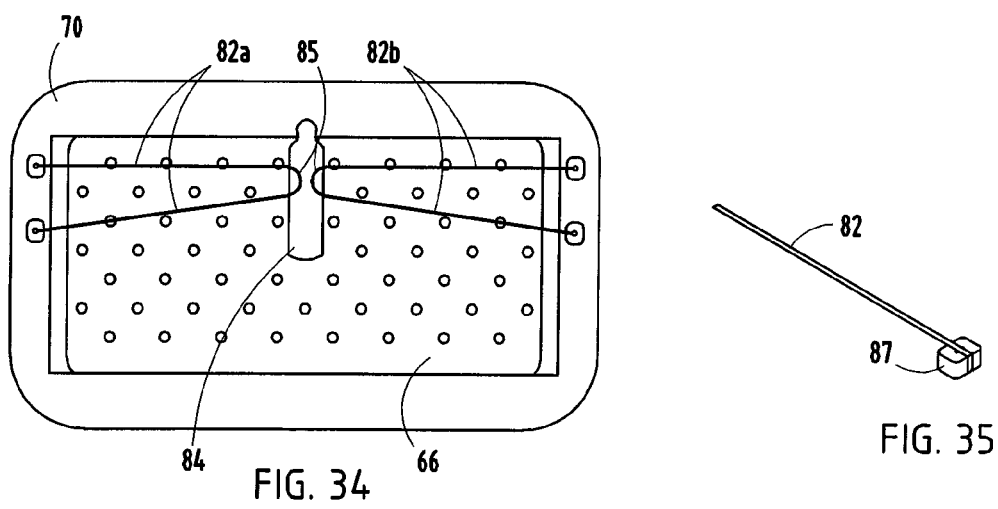
FIG. 34
FIG. 35

BATTERY HAVING FLUID MANAGER AND SLIDING VALVE WITH FRICTION REDUCTION MEMBERS

BACKGROUND OF THE INVENTION

This invention relates to fluid regulating systems for controlling the rate of entry of fluids, such as gases, into and out of electrochemical batteries and cells with fluid consuming electrodes, and to the batteries and cells in which such fluid regulating systems are used, particularly air-depolarized, air-assisted and fuel cells and batteries.

Electrochemical battery cells that use a fluid, such as oxygen and other gases, from outside the cell as an active material to produce electrical energy, such as air-depolarized, air-assisted and fuel cell battery cells, can be used to power a variety of portable electronic devices. For example, air enters into an air-depolarized or air-assisted cell, where it can be used as, or can recharge, the positive electrode active material. The oxygen reduction electrode promotes the reaction of the oxygen with the cell electrolyte and, ultimately, the oxidation of the negative electrode active material with the oxygen. The material in the oxygen reduction electrode that promotes the reaction of oxygen with the electrolyte is often referred to as a catalyst. However, some materials used in oxygen reduction electrodes are not true catalysts because they can be at least partially reduced, particularly during periods of relatively high rate of discharge.

One type of air-depolarized cell is a zinc/air cell. This type of cell uses zinc as the negative electrode active material and has an aqueous alkaline (e.g., KOH) electrolyte. Manganese oxides that can be used in zinc/air cell air are capable of electrochemical reduction in concert with oxidation of the negative electrode active material, particularly when the rate of diffusion of oxygen into the air electrode is insufficient. These manganese oxides can then be reoxidized by the oxygen during periods of lower rate discharge or rest.

Air-assisted cells are hybrid cells that contain consumable positive and negative electrode active materials as well as an oxygen reduction electrode. The positive electrode can sustain a high discharge rate for a significant period of time, but through the oxygen reduction electrode, oxygen can partially recharge the positive electrode during periods of lower or no discharge, so oxygen can be used for a substantial portion of the total cell discharge capacity. This means the amount of positive electrode active material put into the cell can be reduced and the amount of negative electrode active material can be increased to increase the total cell capacity. Examples of air-assisted cells are disclosed in commonly assigned U.S. Pat. Nos. 6,383,674 and 5,079,106.

An advantage of air-depolarized, air-assisted, fuel cells is their high energy density, since at least a portion of the active material of at least one of the electrodes comes from or is regenerated by a fluid (e.g., a gas) from outside the cell.

A disadvantage of these cells is that the maximum discharge rates they are capable of can be limited by the rate at which oxygen can enter the oxygen reduction electrode. In the past, efforts have been made to increase the rate of oxygen entry into the oxygen reduction electrode and/or control the rate of entry of undesirable gases, such as carbon dioxide, that can cause wasteful reactions, as well as the rate of water entry or loss (depending on the relative water vapor partial pressures outside and inside the cell) that can fill void space in the cell intended to accommodate the increased volume of discharge reaction products or dry the cell out, respectively. Examples of these approaches can be found in U.S. Pat. No. 6,558,828; U.S. Pat. No. 6,492,046; U.S. Pat. No. 5,795,667; U.S. Pat. No. 5,733,676; U.S. Patent Publication No. 2002/0150814; and International Patent Publication No. WO02/35641. However, changing the diffusion rate of one of these gases generally affects the others as well. Even when efforts have been made to balance the need for a high rate of oxygen diffusion and low rates of $CO_2$ and water diffusion, there has been only limited success.

At higher discharge rates, it is more important to get sufficient oxygen into the oxygen reduction electrode, but during periods of lower discharge rates and periods of time when the cell is not in use, the importance of minimizing $CO_2$ and water diffusion increases. To provide an increase in air flow into the cell only during periods of high rate discharge, fans have been used to force air into cells (e.g., U.S. Pat. No. 6,500,575), but fans and controls for them can add cost and complexity to manufacturing, and fans, even micro fans, can take up valuable volume within individual cells, multiple cell battery packs and devices.

Another approach that has been proposed is to use valves to control the amount of air entering the cells (e.g., U.S. Pat. No. 6,641,947 and U.S. Patent Publication No. 2003/0186099), but external means, such as fans and/or relatively complicated electronics, can be required to operate the valves.

Yet another approach has been to use a water impermeable membrane between an oxygen reduction electrode and the outside environment having flaps that can open and close as a result of a differential in air pressure, e.g., resulting from a consumption of oxygen when the battery is discharging (e.g., U.S. Patent Publication No. 2003/0049508). However, the pressure differential may be small and can be affected by the atmospheric conditions outside the battery.

Commonly assigned U.S. Patent Publication No. 2005/0136321 discloses a valve that is operated by an actuator that responds to changes in a potential applied across the actuator to open and close the valve.

SUMMARY OF THE INVENTION

According to one aspect of the present invention, a battery is provided which includes a fluid regulating system. The battery includes at least one fluid consuming cell having a cell housing including one or more fluid entry ports for the passage of a fluid into the cell, a first fluid consuming electrode disposed within the cell housing, and a second electrode disposed within the cell housing. The battery also includes a fluid regulating system having a first plate disposed in fluid communication with the one or more fluid entry ports. The first plate has at least one plate aperture. The fluid regulating system includes a second plate disposed adjacent to the first plate and having at least one plate aperture. The first and second plates form a valve. The fluid regulating system also has an actuator for moving the first plate relative to the second plate to open and close the valve to regulate the passage of fluid into the cell. The fluid regulating system further includes a friction reduction medium disposed between the first plate and the second plate, wherein the friction reduction medium comprises a plurality of round members.

According to another aspect of the present invention, a fluid regulating system is provided for controlling the passage of a fluid into a battery cell. The fluid regulating system includes a first plate disposed in fluid communication with the battery cell, the first plate having at least one plate aperture, and a second plate disposed adjacent to the first plate and having at least one plate aperture. The first and second plates form a valve. The fluid regulating system also includes an actuator for moving the first plate relative to the second plate to open and close the valve to regulate the passage of fluid into the battery cell. The fluid regulating system further includes a friction reduction medium disposed between the first plate and the second plate, wherein the friction reduction medium includes a plurality of round members.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 1 is a perspective view of a battery constructed in accordance with a first embodiment of the present invention showing the top of the battery;

FIG. 2 is a perspective view of the battery shown in FIG. 1 showing the bottom of the battery;

FIG. 3 is an exploded perspective view showing the bottom of the battery along with the components forming a fluid regulating system used with the battery;

FIG. 12 is an exploded perspective view of a variation of the battery of the first embodiment of the present invention;

FIG. 13 is a partial cross-sectional view of one possible implementation of the alternative battery construction shown in FIG. 12;

FIG. 14 is another possible configuration of the alternative battery construction shown in FIG. 12;

FIG. 15 is a partial cross-sectional view showing a different construction for the first embodiment of the present invention;

FIG. 16 is a partial cross-sectional view of yet another possible implementation of the first embodiment of the present invention;

FIG. 29 is an exploded perspective view of a battery in accordance with a sixth embodiment of the invention, with the fluid regulating system actuators and control circuit not shown;

FIG. 30 is a cross-sectional view of the fluid regulating system of the battery shown in FIG. 29, as viewed from the right side;

FIG. 31 is a cross-sectional view of a fluid regulating system in accordance with a seventh embodiment of the invention;

FIG. 33C is a top view of an embodiment of the valve shown in FIG. 33B, but with an actuator in an elongated condition;

FIG. 33D is a top view of an embodiment of the valve shown in FIG. 33A, but with both actuators in a shortened condition;

FIG. 34 is a top view of a portion of a fluid regulating system in accordance with an embodiment of the invention;

FIG. 35 is a perspective of an SMA wire fastened to a connector;

DETAILED DESCRIPTION OF THE PREFERRED EMBODIMENTS

Figure 4:
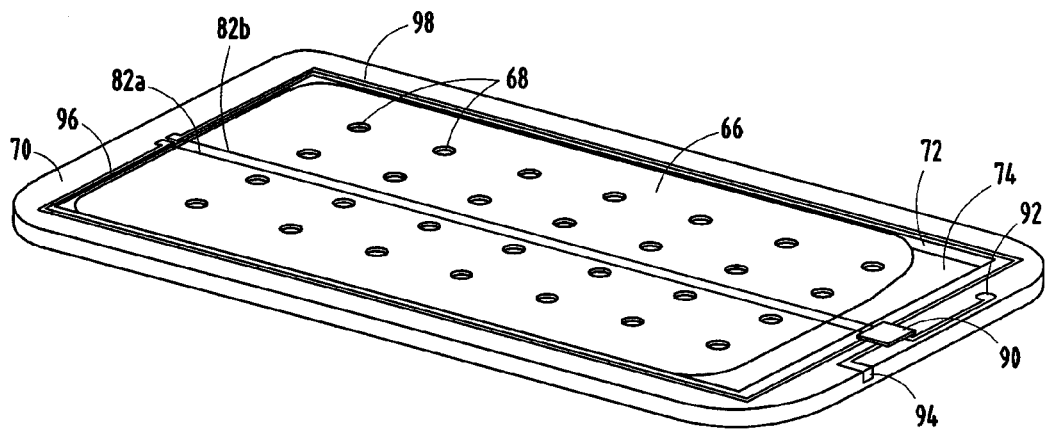
FIG. 4 is a perspective view of the first construction of a fluid regulating system useful in the battery shown in FIGS. 1 and 17.

Embodiments of this invention include a battery that includes an electrochemical cell that utilizes a fluid (such as oxygen or another gas) from outside the cell as an active material for one of the electrodes. The cell has a fluid consuming electrode, such as an oxygen reduction electrode. The cell can be an air-depolarized cell, an air-assisted cell, or a fuel cell. The battery also has a fluid regulating system for adjusting the rate of passage of fluid to the fluid consuming electrode (e.g., the air electrodes in air-depolarized and air-assisted cells) to provide a sufficient amount of the fluid from outside the cell for discharge of the cell at high rate or high power, while minimizing entry of fluids into the fluid consuming electrode and water gain or loss into or from the cell during periods of low rate or no discharge.

Preferably the fluid regulating system will have a fast response to changes in cell potential, a long cycle lifetime, a low operating voltage that is well matched to the cell voltage range on discharge, and a high efficiency. In addition, the regulating system will preferably have a low permeability to the fluids being managed in the closed position, open and close in proportion to the need for the active fluid in the cell, require only a very small amount of the total cell discharge capacity, have a small volume and be easy and inexpensive to manufacture and incorporate into or onto the cell.

As used herein, unless otherwise indicated, the term "fluid" refers to fluid that can be consumed by the fluid consuming electrode of a fluid consuming cell in the production of electrical energy by the cell. The present invention is exemplified below by air-depolarized cells with oxygen reduction electrodes, but the invention can more generally be used in fluid consuming cells having other types of fluid consuming electrodes, such as fuel cells. Fuel cells can use a variety of gases from outside the cell housing as the active material of one or both of the cell electrodes.

As described further below with respect to FIGS. 1-3, a battery 10 constructed in accordance with the present invention includes a fluid consuming cell 20 and a fluid regulating system 50. The fluid regulating system 50 regulates the flow of fluid to the fluid consuming electrode(s) of fluid consuming cell 20. For an air-depolarized cell, the fluid regulating system is disposed on the inside or outside of a cell housing 30 of fluid consuming cell 20 and on the air side of the oxygen reduction electrode (i.e., on, or a part of, the surface of the oxygen reduction electrode that is accessible to air from the outside of the cell housing).

A first embodiment of a battery 10 constructed in accordance with the present invention is shown in FIGS. 1-3. As shown, fluid consuming cell 20 (in this case an air-depolarized cell) includes a cell housing 30, which includes a first housing component and a second housing component, which may include a can 34 and a cover 36, respectively, or may have shapes or sizes differing from what would otherwise be considered a can or cover. For purposes of example, the first housing component is hereinafter referred to as can 34, while the second housing component is hereinafter referred to as cover 36. Can 34 and cover 36 are both made of an electrically conductive material, but are electrically insulated from one another by means of a gasket 38 (FIG. 13). Can 34 generally serves as the external positive contact terminal for the fluid consuming cell 20, whereas cover 36 serves as the external negative contact terminal. As discussed further below, cell 20 further includes a first electrode 40, which may be the fluid consuming electrode or air electrode, a second electrode 42, which may be the negative electrode (i.e., anode), and a separator 44 disposed between the first and second electrodes (see FIG. 13). First electrode 40 is preferably electrically coupled to can 34, whereas second electrode 42 is preferably electrically coupled to cover 36.

Can 34 includes a bottom surface 35 in which a plurality of fluid entry ports 64 are provided such that fluid may pass to the interior of cell housing 30 so as to reach the fluid consuming electrode 40 (see FIG. 13).

In the embodiment shown in FIGS. 1-3, a fluid regulating system 50 is secured to the exterior of bottom surface 35 of can 34. The particular manner by which fluid regulating system 50 may be attached to the exterior of cell 20 is discussed further below. In addition, further embodiments are described below in which fluid regulating system 50 is incorporated on the inside of fluid consuming cell 20.

The fluid regulating system 50 according to this particular embodiment may include a valve 60 including a first plate 62

(which may correspond to bottom surface 35 of can 34) having a plurality of apertures 64 (which may correspond to fluid entry ports), and a movable second plate 66 including a plurality of apertures 68 that correspond in size, shape, number, and position to apertures 64 formed in first plate 62. The size, shape, number, and position of apertures 64 and 68 are preferably optimized to provide the desired volume and distribution of fluid applied to the fluid consuming electrode. The size, shape, number and relative location of apertures, 64 do not have to be the same as the size, shape, number and relative location of apertures 68. For example, if apertures 64 are slightly different in size from apertures 68, precise alignment of apertures 64 and 68 is not essential to achieve the maximum total open area through plates 62 and 66.

Figure 5A:
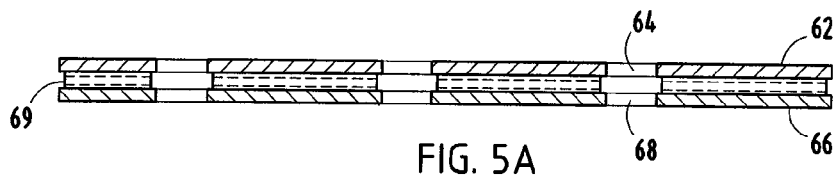
FIGS. 5A and 5B are partial cross-sectional views illustrating the valve of the fluid regulating system in open and closed positions.
Figure 5B:
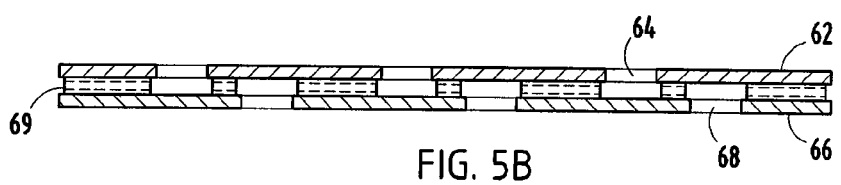

Fluid regulating system 50 may further include a chassis 70 having an annular body portion 72 with an opening 74 in which second plate 66 is disposed. Opening 74 is preferably shaped and sized to contact the elongated side edges of plate 66 while providing excess space at the shorter side of plate 66 such that plate 66 may be slid linearly along an axis in parallel with its longest dimension. Thus, as shown in FIGS. 5A and 5B, the apertures 68 of second plate 66 may be moved into and out of alignment with apertures 64 of first plate 62 to thereby open and close valve 60. The chassis is preferably configured as further discussed below, to guide and possibly retain second plate 66 adjacent the first plate 62. As shown in FIGS. 5A and 5B, a lubricating layer 69 made of oil or TEFLON® may be disposed between plates 62 and 66 to enable second plate 66 to more readily slide along the surface of plate 62. Thus, lubricating layer 69 enables the valve to be opened and closed requiring less force by the actuator. In addition, because it may be difficult to get the surfaces of plates 62 and 66 to be sufficiently smooth so as to provide a good seal, the lubricating fluid 69 may be utilized to enhance the sealing characteristic of the valve without requiring complex and expensive machinery of the plates to otherwise further smooth their surfaces. Second plate 66 may be made of a magnetic material, such as that commonly used in the gaskets provided on refrigerators. By utilizing a magnetic plate 66, chassis 70 does not need to be configured so as to include any mechanism for otherwise holding plate 66 firmly against plate 62. The magnetic plate 66 is preferably a flexible, magnet that can conform to the shape of adjacent plate 62. Magnetic plate 66 can be made from suitable magnetic material, such as a blend of ferromagnetic (e.g., barium/strontium ferrite) and elastomeric materials. The magnetic plate 66 can be a permanent magnet that does not consume energy from the cell 20 to maintain sufficient magnetic force. In the embodiments shown in FIGS. 3 and 12, moveable second plate 66 can be constrained on the top and bottom by a lid 100 (as described further below) and bottom surface 35 of can 34. In an alternative embodiment, battery 10' has a fluid regulating system 50' shown in FIGS. 29 and 30. The chassis 70' is taller than chassis 70 in FIGS. 3 and 12. This can facilitate the movement of fluid between the lid 100 and the moveable plate 66, thereby providing more uniform distribution of fluid across the surface of plate 66 and more uniform flow of fluid through apertures 68 and 64 when plates 66 and 62 are aligned in an open position.

Chassis 70' can include an inward extending ledge 71, creating a race or groove 73 within which plate 66 can slide. The vertical position of ledge 71 can be selected to create a race 73 of the desired dimensions to hold plate 66 firmly enough against surface 35 to provide a good seal when plates 66 and 62 are aligned in a closed position but not so tightly as to interfere with the desired sliding motion of plate 66. Ledge 71 can be an integral part of chassis 70', or it can be a separate component. For example, ledge 71 can be in the form of a flat washer or strip insert molded into the chassis body 72', or it can be a separate component affixed to the chassis body 72'. The ledge 71 can be made of the same material as chassis body 72' or a different material. Materials for the chassis body 72' and ledge 71 can be selected to provide both the desired strength and smooth sliding of plate 66 within the race 73. If either the chassis body 72' or ledge 71 is made from an electrically conductive material, insulation from the electrical components of the actuator 80 and control circuit 90 may be required. As an alternative to a continuous ledge, a series of projections can be used.

The ledge 71 and/or chassis body 72' can also be modified to incorporate one or more additional structures, such as ribs extending across the opening 74' above plate 66, to hold the central portion of plate 66 flat. Alternatively, downward projections from the lid 100 can be used to hold the central portion of plate 66 flat.

The chassis 70' can include a second race 77 in which the lid 100 is held, as shown in FIG. 31. This second race can be formed by one or more additional ledges 79a and 79b. This arrangement can facilitate pre-assembly of the lid and components of the fluid regulating system, to be added to the fluid consuming cell at another step in the manufacturing process. In another embodiment in which the stationary plate 62 is not a surface 35 of the can 34, the chassis 70' can include another ledge (not shown) below ledge 71, forming a larger race that retains the stationary plate 62 as well as movable plate 66.

The ledge 71 of chassis 70' can be a continuous ledge extending around the entire perimeter of opening 74', or it can be a discontinuous ledge extending along only part of the perimeter, as shown in FIG. 29. If the discontinuous ledge is suitably located and the moving plate 66 is sufficiently flexible, if the pressure within the cell becomes excessive, the edge of the moving plate 66 can bow outward between the ends of the discontinuous ledge 71 to provide a passageway between the plate 66 and both plate 62 and chassis frame 72' through which gases can escape to the external environment when the valve is partially open or closed. In such embodiments the plate 66 preferably has spring-like properties so that when the internal cell pressure is sufficiently reduced the plate 66 will again conform to the shape of the surface 35 of the can 34.

In an alternative embodiment in which the lid serves as the stationary valve plate and the moveable plate is disposed adjacent to the lid, the chassis can include a ledge to hold the moveable plate against the lid while maintaining a space between the moveable plate and the surface of the can bottom, to facilitate uniform air distribution to the apertures in the can. As described above, this embodiment can also include a second race in the chassis in which the lid is held.

The fluid regulating system can be actuated in response to the voltage of the fluid depolarized cell, as described below, or it can be actuated by the user, or a combination of methods can be used. For example, when the user of a device powered by the device turns the device switch to the on position, the valve can be initially opened by mechanical action, and when the user turns the device switch to the off position, the valve can be initially closed by mechanical action. While the device switch remains in the on position, a control circuit can control the operation of the valve. In another example, when the device is turned on, power from the cell can be applied to the fluid regulating system to initially open the valve, and when the device is turned off, the valve can be actuated to close.

An actuator is preferably provided as a part of fluid regulating system 50 to actuate valve 60. The actuator may include a control circuit 90 that senses the voltage of fluid consuming cell 20 and which generates a control signal in response to the detected cell voltage. Circuit 90 may be an application specific integrated circuit (ASIC), which is preferably mounted on a surface of chassis 70. The body 72 of chassis 70 is preferably made of a non-conductive material such that tracings 96 and 98 may be printed on a surface of the chassis as further discussed below. Chassis 70 may thus be a printed circuit board. The chassis could be molded or shaped and most or all of the electrical connections could be pressure contacts to minimize the sophistication of assembly. The chassis may, however, require some machining and some electrical connections and may require some soldering or welding. The selection of the chassis material may be based on its compatibility with its multi-functional use as a frame to house the valve, as a printed circuit board for the electronics, and for its ability/compatibility to be attached to the cell. A strategic depression may be provided in and/or on a laminar structure of the chassis for mounting the control circuit 90. This would allow any mounted parts to be maintained flush with the surface of the chassis to facilitate assembly with the cell. It is also possible that it may become desirable to coat the printed circuit tracings such as tracings 96 and 98 with a nonconductive material to prevent shorting if pressed against a metal lid 100 or can 34. Alternatively, one or more recesses may be provided in the chassis, such as by molding or machining, to accommodate all or a portion of one or more components of the control circuit and the actuator. These recesses can be useful to allow positioning of components in different locations on the chassis and anchoring of components that extend beyond the chassis frame, as described below.

As a platform for the electronics, it would be desirable for the base material of chassis 70 to be an existing PCB material. The most common base materials contain epoxy resins and fiberglass reinforcement. It may be desirable for chassis 70 to be of laminar construction to integrate and protect the electronic circuit components, as well as to maintain a flush surface, parallel with bottom surface 35 of can 34. As described above, the inside diameter of the chassis may utilize a metal race for durability to house sliding valve plate 66. The race may "lock" plate 66 in place (so it does not fall out), provide enough axial force to prevent the valve from separating during use but insufficient force to prevent plate 66 from sliding. The chassis may thus be formed, molded, or machined, dependent on the material selection, so as to achieve the valve race shape, whether metal or not, to flush mount a chip and to generate vias (through-holes). There may be conductive circuitry within the vias, on one side and an edge of a chassis if mounted external to the cell, or on both sides of chassis 70 if mounted internal to the cell.

A conductive pathway for circuit 90 may be provided on both sides of chassis 70 and within the vias. This may be accomplished by a plating process or screen printing a conductive paste, especially to fill the vias. Conductive foil could be applied to the substrate at formation and the unwanted portion etched away. Copper is the most common material used. It may require multiple layers and multiple materials to assure adherence to the substrate depending on the base material utilized.

One method of attaching an ASIC serving as control circuit 90 is to use a direct method, as opposed to a packaged chip, due to volume constraints. Common methods of direct chip attachment include wire bonding and flip chip. Wire bonding would use wires about 0.02 mm (0.0008 inch) in diameter that are bonded to the four to six chip pads and the circuit substrate. The chip and wire bonds may be encapsulated in non-conductive epoxy for protection. With a flip chip attachment, the pads may be pre-finished with a Pb/Sn solder and, in turn, soldered to the substrate. Once attached, the chip may be encapsulated with non-conductive epoxy to provide protection.

In the embodiment shown in FIGS. 3 and 4, the actuator further includes a plurality of shape memory alloy (SMA) components that particularly include a first SMA wire 82a and second SMA wire 82b. The SMA wires are secured at either end of the chassis 70 and are electrically coupled to tracings 96 and 98, which extend from control circuit 90 to an opposite side of chassis 70. By supplying a control signal that passes a current through SMA wires 82a and 82b, the control circuit 90 may cause the SMA wires to heat up, which causes the SMA wires to expand or constrict to a particular length. This in turn causes the SMA wires 82a and 82b to pull second plate 66 in one direction or opposite direction and thus causes plate 66 to slide in and out of an open or closed position so as to selectively allow fluid (i.e., air) to pass into the interior of cell housing 30.

As shown in FIG. 4, two contact terminals 92 and 94 are provided on chassis 70 for connection to the positive and negative terminals of cell 20. The contact terminals 92 and 94 may be provided on any surface of chassis 70, and as discussed below, it may be preferable to provide one of the contact terminals, particularly terminal 94, on an outer facing edge surface of chassis 70 such that it may be exposed to the outside of the battery assembly for subsequent connection to the cover 36 of cell 20. Contact terminal 92, on the other hand, may best be provided on an inner surface that is either pressed into electrical contact with a conductive portion of lid 100 or on the opposite surface in electrical connection with the bottom surface 35 of can 34. The manner by which electrical connections of contact terminals 92 and 94 are made to can 34 and cover 36 of cell 20 are discussed further below.

As shown in FIG. 3, fluid regulating system 50 may further include a lid or cover 100 that extends over and optionally around chassis 70 to protect and shield fluid regulating system 50. Lid 100 preferably includes one or more holes 102 to allow fluid to pass from the outside to valve 60 for selective passage into cell 20. As mentioned above, lid 100 may serve as first plate 62.

Figure 6:
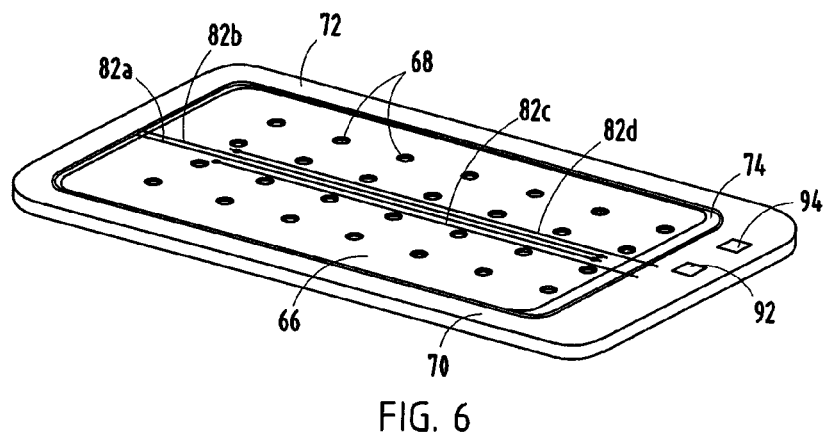
FIG. 6 is a perspective view of an alternative construction of a fluid regulating system useful in the batteries of FIGS. 1 and 17.
Figure 7:
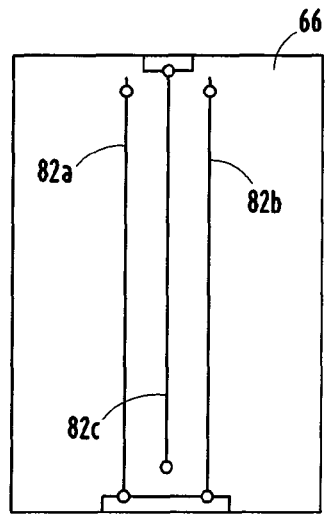
FIG. 7 is a schematic view of a first alternative actuator construction for use with the present invention.
Figure 8:
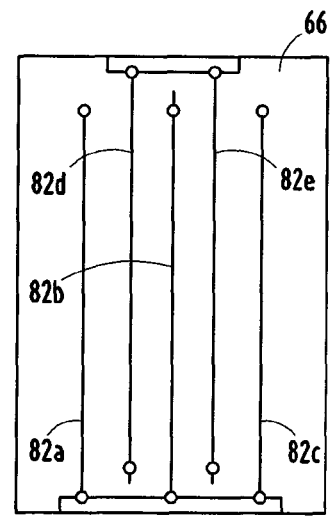
FIG. 8 is another alternative construction for an actuator useful with the present invention.

Preferably valve 60 is in an open condition when a current is applied indicating that cell 20 is in use, and is closed when a current is not applied indicating that the cell is not in use. In the embodiments discussed with respect to FIGS. 3, 4, 6, 7, 8, 12, 32, 33A-D, 34, 36-44, 53, and 54 the SMA wires 82a-82e pull, but do not push the second valve plate 66. Thus, in FIGS. 3 and 4 first SMA wire 82a pulls the valve open, whereas second SMA wire 82b pulls the valve closed. In the embodiment shown in FIG. 6, two wires 82a and 82b are utilized to pull valve plate 66 in one direction, while two additional wires 82c and 82d are used pull the plate in the opposite direction. In FIG. 7, two wires 82a and 82b are used to pull the plate 66 in one direction, while a single wire 82c is used to pull the plate 66 in the opposite direction. In FIG. 8, three wires 82a, 82b, and 82c are used to pull the plate in one direction while two wires 82d and 82e are used to pull the plate in the opposite direction. The SMA wires 82 may be disposed in parallel and are provided in a symmetric fashion about a center point of the valve plate 66 so as to supply an even force to prevent plate 66 from binding within chassis 70. In general, when the current applied to the SMA wires is provided from the cell it can be advantageous for current to be applied only to initiate movement of the actuator and not while the actuator is in a static condition in order to prevent unnecessary use of cell capacity. As shown, the SMA wires may be mounted to extend substantially parallel to one another. The SMA wires may also be mounted to extend parallel to the direction in which plate 66 moves (see e.g., FIG. 3) or perpendicular to the direction in which plate 66 moves (see e.g., FIGS. 9, 9A and 9B).

SMA wires may be made with any conventional shape metal alloy. A shape memory alloy is an alloy that can be deformed at one temperature but when heated or cooled returns to its previous shape. This property results from a solid phase transformation, between the Martensite and Austenite phases. Preferred shape memory alloys have a two-way shape memory; i.e., the transformation is reversible, upon both heating and cooling. Examples of shape memory alloys include nickel-titanium, nickel-titanium-copper, copper-zinc-aluminum and copper-aluminum-nickel alloys, with nickel-titanium and nickel-titanium-copper being preferred. The use of nickel-titanium-copper (e.g., with about 5-10 weight percent copper) can be advantageous for actuators that may be operated many times because of its resistance to fatigue. Manufacturers of nickel-titanium and other shape memory alloys include Specialty Metals, Shaped Memory Alloy Division (New Hartford, N.Y., USA), Memry Corporation (Bethel, Conn., USA), and Dynalloy, Inc. (Mesa, Calif., USA).

Figure 9:
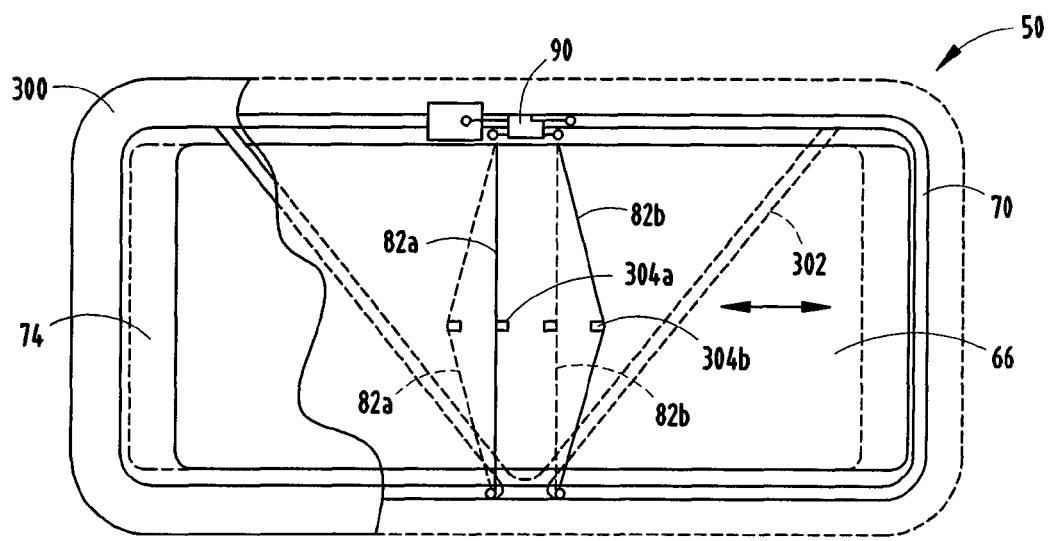
FIG. 9 is a top view of a fluid regulating system employing another actuator construction and an overmolded chassis useful with the present invention.
Figure 9A:
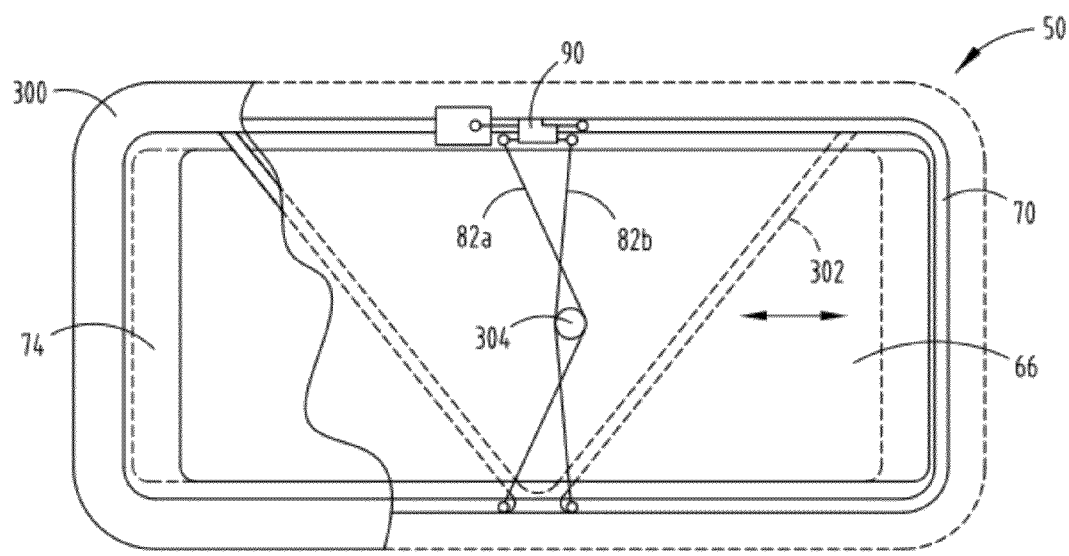
FIG. 9A is a top view of a fluid regulating system employing an actuator with a single pin, according to another embodiment of the present invention.

FIG. 9 shows another manner to attach to SMA wires 82a and 82b in order to move plate 66. According to this variation, SMA wires 82a and 82b are not provided to extend along the longest dimension of the plate 66, they instead are substantially perpendicular to the direction of movement of plate 66. The first wire 82a may be heated to cause first wire 82a to contract, while second wire 82b is not heated allowing that wire to flex. Thus, the plate 66 may be shifted in a first direction (to the right in FIG. 9 as shown with solid lines). To move the plate in the opposite direction (i.e., to the left), a current may be removed from wire 82a thus allowing wire 82a to cool and flex, while a current may be applied to wire 82b thus heating wire 82b and causing it to contract. This causes the plate and wires to move to the position shown in dashed lines in FIG. 9.

The chassis 70 is shown having control circuit 90 and circuit traces formed on the top surface of the chassis body 72. Additionally, the SMA wires 82a and 82b are attached to a top surface of the chassis 70 in electrical contact with the circuit traces. The chassis 70 is further shown in FIG. 9 having an overmold body 300 formed over the control circuit 90 and circuit traces so as to encapsulate and protect the components provided on chassis 70. Thus, the overmold body 300 serves as part of the chassis 70. The overmold body 300 may include a non-conductive epoxy or other overmolding material. Additionally, the overmold body 300 is further shown including integrally formed ribs 302 which extend across the opening 74 above moving plate 66. The ribs 302 are shown formed in a generally V-shape and serve to hold the central portion of the moving plate 66 flat above the underlaying fixed plate 62. In one embodiment, the fixed plate 62 is connected to the bottom side of chassis 70 or its overmold body 300 and the battery cell is connected to the top side of the overmold body 300 of chassis 70.

In the embodiment shown in FIG. 9, the first and second SMA wires 82a and 82b engage separate actuator pins 304a and 304b, respectively, which are connected to the moving plate 66. In the embodiment shown in FIG. 9A, a single actuator pin 304 may be utilized in the fluid regulating system 50. With a single actuator pin 304, the first SMA wire 82a engages one side of pin 304, while the second SMA wire 82b engages the opposite side of pin 304, such that SMA wires 82a and 82b actuate pin 304 in opposite directions to move plate 66 left and right to open and close the valve. In this embodiment, the actuator pin 304 may include wire receiving portions, such as detents or slots, at different elevations to engage the corresponding SMA wires 82a and 82b at different heights, such that the SMA wires 82a and 82b do not contact or otherwise interfere with each other.

Figure 9B:
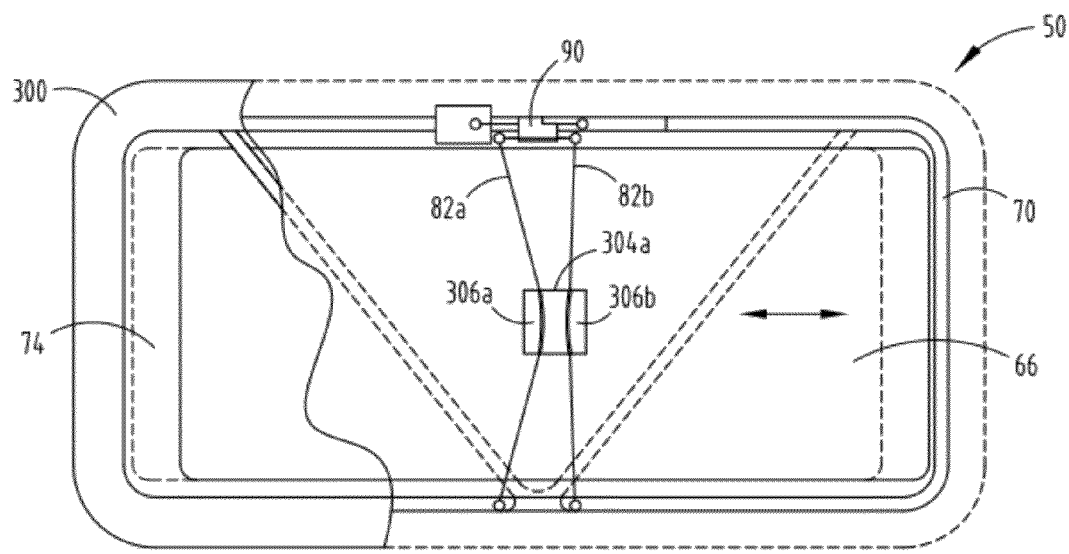
FIG. 9B is a top view of a fluid regulating system employing an alternate pin actuator assembly.

Referring to FIG. 9B, an alternative actuator structure 304A is shown employed in a fluid regulating system 50, according to another embodiment. Structure 304A is shown including first and second portions 306a and 306b that are elevated above the remainder of the generally rectangular pin 304A such that the SMA wire 82a engages portion 306a and SMA wire 82b engages portion 306b. Portions 306a and 306b may include upstanding members as shown. Alternately, portions 306a and 306b may include slots formed within a pin or other structure 304A. Accordingly, single or multiple actuator engagement structures may be employed to allow the SMA wires 82a and 82b to actuate the moving plate 66 in either direction to open and close the valve.

Figure 10A:
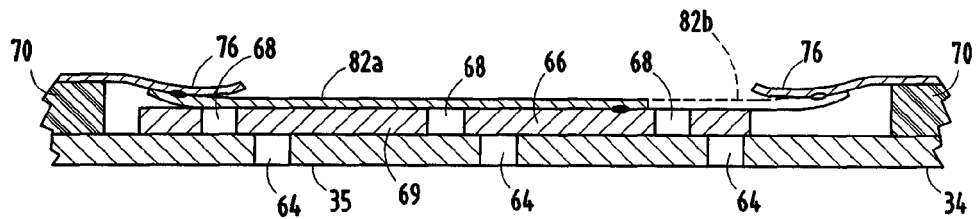
FIGS. 10A and 10B are cross-sectional views of the portion of the battery including the valve as used in the present invention.
Figure 10B:
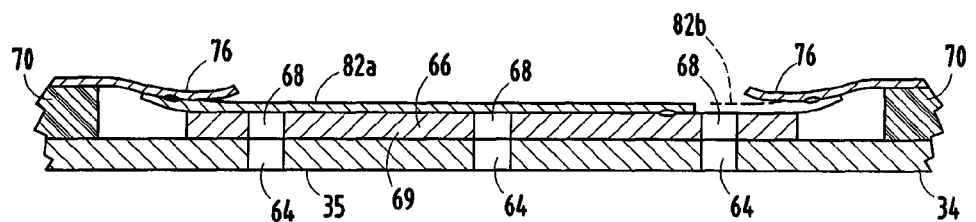

FIGS. 10A and 10B show two side views of valve 60 used adjacent an outer surface of can 34. FIG. 10A shows a cell at rest in which case valve 60 is closed so that the apertures 64 and 68 do not align. FIG. 10B shows the position of the valve's second plate 66 when moved into an open position which would occur when the cell is in use. This causes apertures 64 and 68 to align and thereby allows fluid to pass into the interior of the cell. As illustrated, SMA wires 82a and 82b may be attached to chassis 70 by means of a pair of spring contacts 76 to which the SMA wires may be crimped, clamped, soldered or welded.

Figure 11:
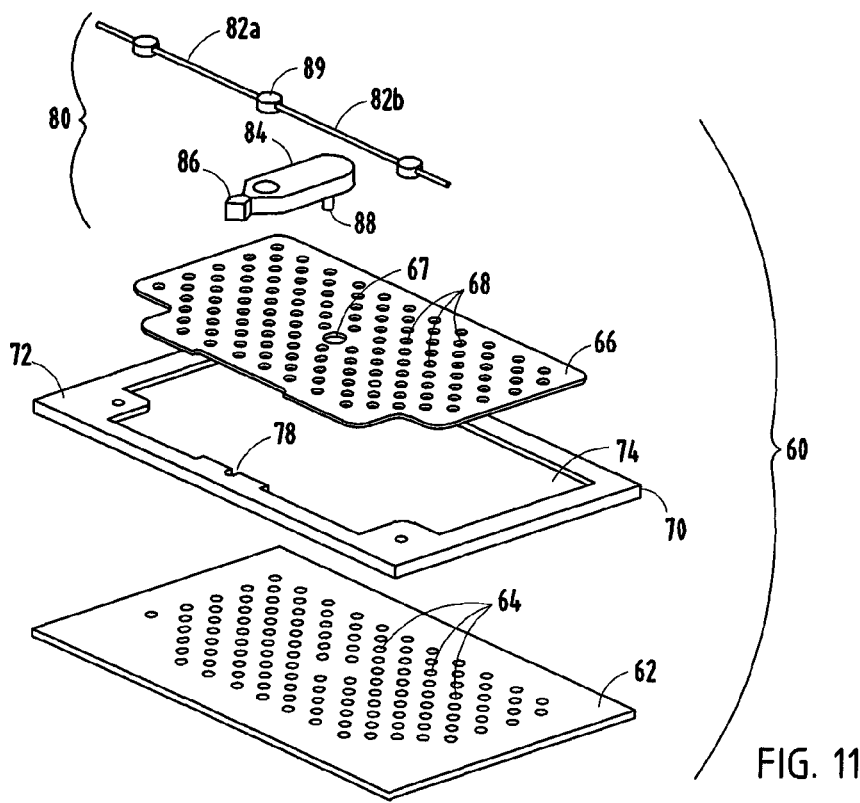
FIG. 11 is an alternative construction of a fluid regulating system that may be used in the various embodiments of the present invention.

FIG. 11 shows another embodiment of valve 60 that may be utilized in various embodiments of the present invention. Valve 60 includes first plate 62 including a plurality of apertures 64. Plate 62 may be a separate plate that is held stationary relative to chassis 70 or may be a portion of the can or cover of a cell housing 30. Plate 62 may be made of metal, which may be magnetic or non-magnetic. Valve 60 further includes second plate 66 including a plurality of apertures 68 that correspond in number, size, shape, and position to apertures 64 and first plate 62. Plate 66 may be a magnetic or non-magnetic metal. Similar to the embodiments discussed above, a chassis 70, which preferably is made of an electrically non-conductive material, includes an annular body 72 with a central opening 74 for receiving plate 66. Opening 74 is configured to be slightly larger than plate 66 in one direction so as to enable plate 66 to slide linearly relative to plate 62 such that apertures 64 and 68 may be moved into and out of alignment to open and close valve 60. The implementation shown in FIG. 11 differs from the implementations discussed above insofar as a lever arm 84 is utilized as a part of actuator 80. Lever arm 84 includes a pivot pin 86 that is received in an aperture or a slot or recess 78 formed in chassis 70 such that lever arm 84 may be pivotably secured to chassis 70. This may be done, for example, by enlarging and reshaping the recess 78 to fit around pivot pin 86 and partially extend into the necked area between the pivot pin 86 and the body of lever arm 84 in such a way as to capture pivot pin 86 within the recess 78 but still allow the lever arm 84 to pivot within the recess 78. Other means of securing the pivot pin 86 to the chassis may be used, such as a downward projection from pivot pin 86 that is received in a hole in a ledge at the bottom of the recess 78. An actuator pin 88 preferably extends downward from the body of lever arm 84 such that it may be received in a hole 67 formed in second plate 66. This allows lever arm 84 to engage plate 66 and thus to slide second plate 66 relative to first plate 62. In this particular configuration, a pair of SMA wires 82a and 82b is attached via an attachment point 89 to a top surface of lever arm 84. The other ends of wires 82a and 82b may be attached to chassis 70. Wires 82a and 82b can be secured to recesses in the chassis, similar to recess 78, for example. They can be secured in any suitable manner, such as with adhesives, with pins or by fitting enlarged heads into recesses with restricted openings. The SMA wires are electrically coupled to a control circuit (not shown in FIG. 11) that selectively applies a current to SMA wires 82a and 82b in response to a sensed cell voltage. In this manner, SMA wires 82a and 82b may pull the lever arm in either of two opposing directions thus causing lever arm 84 to slide second plate 66 relative to first plate 62. In this case, chassis 70 serves as a mounting location for the pivot point of lever arm 84 and of the ends of SMA wires 82 while also providing a guide for guiding plate 66 relative to plate 62.

Other arrangements of SMA wires and levers can be used to operate a valve in a fluid regulating system. For example, SMA wires 82a and 82b can be attached to lever arm 84 via two separate attachment points rather than a single attachment point 89. In an alternative embodiment, SMA wires 82a and 82b are each fastened at both ends to the chassis 70, with the center of each wire connected to the lever 84 by fitting the wires 82a and 82b into recessed grooves 85 in the lever arm 84, as shown in FIG. 34.

SMA wires can be connected to components of a fluid regulating system in any suitable manner. In one embodiment one or both ends of an SMA wire 82 are captured within a suitably sized connector 87, as shown in FIG. 35. Preferably the SMA wire 82 is crimped into the connector 87. Optionally the wire can be glued, welded or soldered to the connector before or after crimping. The connector can then be inserted into a corresponding aperture in the component (e.g., chassis 70 or lever arm 84) to connect the SMA wire 82 to that component. Preferably the connector 85 is electrically conductive and can make electrical contact between the SMA wire 82 and a portion of the control circuit disposed on the surface of the component defining the aperture. The connector 87 can be held in place within the aperture by an interference fit, an electrically conductive adhesive, solder or a weld, for example.

In embodiments in which a control circuit is used to restrict the flow of current through the SMA wire(s) to only the time required to move the valve to an open or closed position, the SMA wires can return to their original length (e.g., elongate) after the current flow is stopped. When this happens, the SMA wires may not hold the plate in the desired position, allowing it to slide to a partially open or partially closed position, for example. This is particularly true when there is an opposing SMA wire for moving the sliding plate to another position; elastic tension from the unactuated opposing SMA can pull the sliding valve as the actuated SMA elongates following the cessation of current. In such situations, the sliding plate can be held in the desired position until the plate is intentionally moved from that position. An example of a means of retaining the sliding plate in a desired position is a latching mechanism. Any suitable mechanism can be used. In one embodiment a spring biased detent can cooperate with a projection from or a recess in a surface of the sliding plate. The spring force can be selected to be sufficient to keep the plate from sliding unintentionally but weak enough to be easily overcome by the action of an opposing SMA wire to slide the plate into another desired position.

In another embodiment the sliding plate is kept from sliding unintentionally by friction between the sliding plate and another cell or fluid regulating system component. The friction between the plate and the other component is sufficient to prevent unintentional sliding but not so great as to interfere with the efficient movement to another position by action of an opposing SMA. The friction can be controlled through the selection of materials for the sliding plate and the other component, a coating applied to one or both parts, or the texturing of one or both of the adjacent surfaces.

The fluid regulating system 50 may be secured to the exterior of cell 20 using a variety of techniques that are discussed below. As shown in FIG. 12, lid 100 may be configured to have a plurality of stand-offs 104 that extend downward from an inner surface of lid 100 and then pass through holes 75 in corresponding locations on chassis 70 such that the stand-offs 104 may be attached to bottom 35 of can 34. FIGS. 13 and 14 show two different constructions for the configuration shown in FIG. 12.

In FIG. 13, a configuration is shown whereby the lid 100 is formed of plastic. In this case, the stand-offs 104 may be ultrasonically welded to the bottom surface of can 34. In this case, there would be no electrical connection between the lid 100 and can 34.

In FIG. 14, the stand-offs 104 are provided as an indentation/protrusion 106 in a metal lid 100 which may be formed by stamping or the like. In this case, the metal lid 100 may be resistance- or laser-welded to the bottom surface 35 of can 34.

FIG. 15 shows an alternative method of connecting chassis 70 and lid 100 to the exterior of cell 20. In this case, vias 105 are provided through the holes 75 of chassis 70 which serve to weld lid 100 to can 34. This weld also provides an electrical connection between lid 100 and cell 20.

FIG. 16 shows yet another technique whereby a metal lid 100 is secured to can 34 using a conductive epoxy 107 that is provided in the holes 75 of chassis 70. As yet another alternative, the fluid regulating system 50 may be secured to the bottom surface of can 34 using an adhesive, a combination of an adhesive and a label (not shown), by means of a press fit of the chassis into one or more grooves coined in the bottom surface of can 34, by such a press fit of the chassis in addition to utilizing an adhesive, by crimping can 34 within a second can where the second outermost can replaces lid 100, by soldering or welding a laminar chassis, or encapsulating the fluid regulating system 50 in an epoxy.

Although the use of SMA wires has been described above as being a preferred component of actuator 80, other components or materials may also be utilized, such as linear electrode-active polymers and bending electro-active polymers, which are associated with artificial muscles. Such materials offer potential advantages including a simpler design, no or simplified electronics, and a proportional response to voltage.

Another consideration relates to the initial activation of the battery. The battery may be built with the valve in the open position and with holes 102 protected by a tab similar to conventional button air cells. Air-up after removal of the tab would activate the cell, initiate electronic control of the valve, and maximize the shelf life of the battery. Alternatively, the battery could be built with a functioning fluid regulating system. This would allow the battery to be immediately useable by the consumer but may also require suitable packaging and storage conditions in the warehouse, store shelves, etc. to prevent moisture ingress in humid environments and moisture egress in dry environments.

In the construction discussed above, the can 34 is proposed to act as the stationary plate 62 of valve 60. However, it may be desirable to provide a separate fixed plate 62 rather than utilizing can 34 such that the can bottom will maintain its hole pattern, but may act more like an air diffuser rather than an integral part of the valve assembly. In addition, the stationary plate 62 may be spaced apart from the can bottom such that if the can 34 bulges, bows, or possibly wrinkles, it will not disrupt the operation of the valve 60. It should be noted that the can 34 may be made with a stronger material, a greater thickness, or a different shape (e.g., ridges in the bottom). An additional advantage of utilizing a separate stationary plate 62 is that the valve 60 may be totally preassembled thus providing a greater stability of the lubricating fluid layer 69. This may come, however, at the cost of a thicker battery.

Although not illustrated in the drawing figures, a label may be provided to the outer surface of cell housing 30. Such a label may extend around the perimeter of the cell so as to further cover the electrical conductor tab 110 (discussed below) as well as the interfaces between the fluid regulating system 50 and cell 20 and to cover the interface between the can 34 and cover 36. Sufficient portions of the cover 36 and the can 34 and/or a conductive lid 100 could remain exposed to provide electrical contact terminals on the outside of the battery.

The particular cell construction illustrated in FIGS. 1-3 is a novel prismatic cell design. The construction differs from a conventional button-type air cell in the relative size and rectangular nature of this cell. Similar air electrodes, anodes, separators and can/cover materials may thus be utilized in cell 20 that are presently used in conventional air cells. It should be appreciated by those skilled in the art, however, that the cell 20 need not have the particular shape, size, or relative dimensions as that shown in the drawings.

Figure 17:
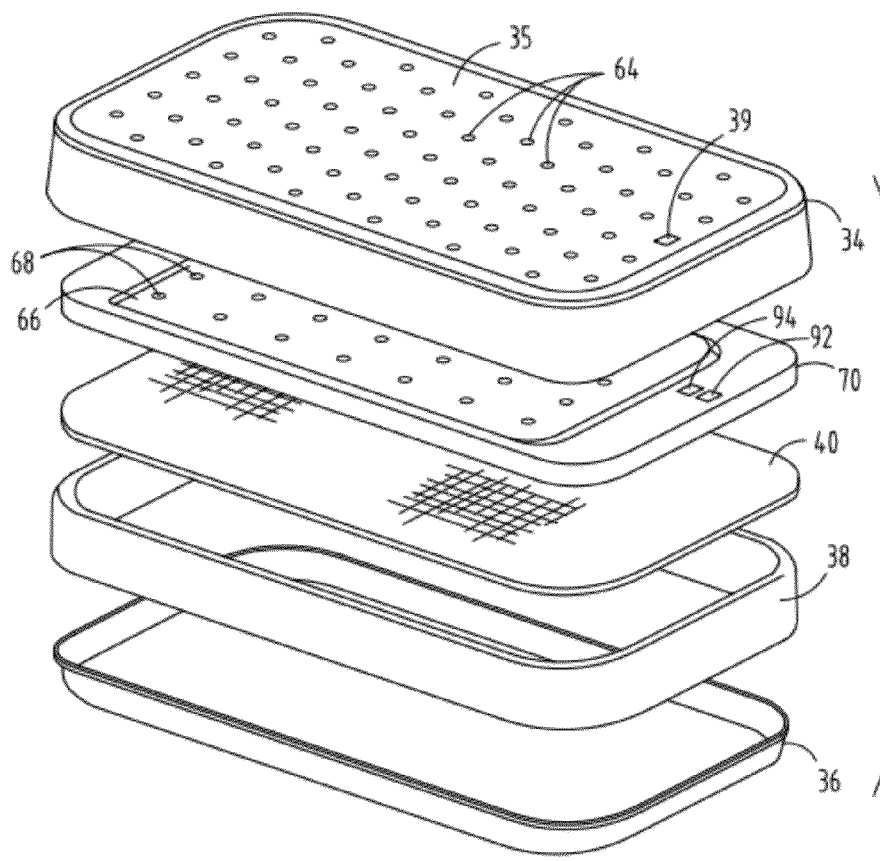
FIG. 17 is an exploded perspective view of a second embodiment of a battery constructed in accordance with the present invention.
Figure 18:
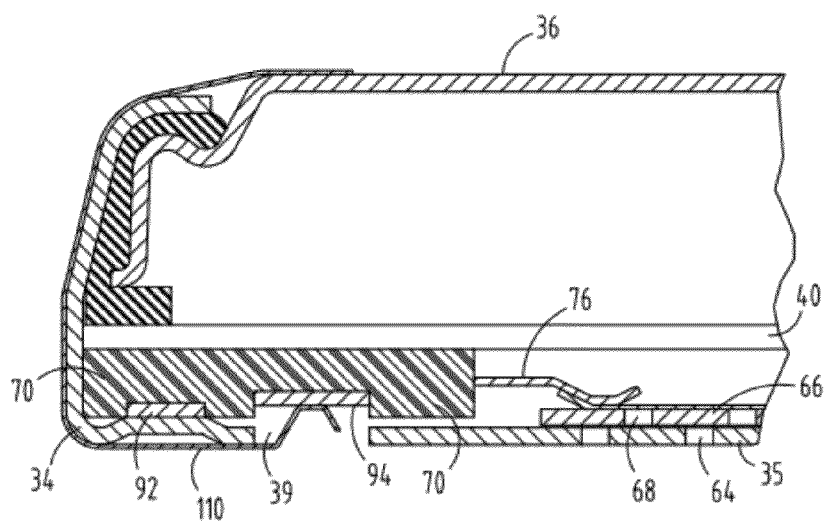
FIG. 18 is a partial cross-sectional view of the battery shown in FIG. 17.

FIG. 17 shows an alternative embodiment of the present invention whereby the fluid regulating system 50 is disposed in the interior of cell housing 30. FIG. 18 shows a cross-sectional view of a portion of this embodiment. As shown in these figures, the cell housing is constructed in a similar manner to that described above with the exception that the cell may be slightly thicker to accommodate the fluid regulating system 50 between air electrode 40 and the inner surface of can 34. In this embodiment, a chassis 70 may also be utilized along with a valve, actuator, and control circuit 90 as described above when applied to the exterior of the cell. Similarly, the bottom of can 34 may serve as first plate 62 of valve 60 and may include a plurality of fluid entry ports 64 which serve as apertures 64. This embodiment differs in that respect insofar as the second plate 66 slides along the inner surface of can 34 rather than the exterior surface. In this and other embodiments discussed below, the chassis 70 and hence the valve 60 may be held in place by gasket 38.

Figure 19:
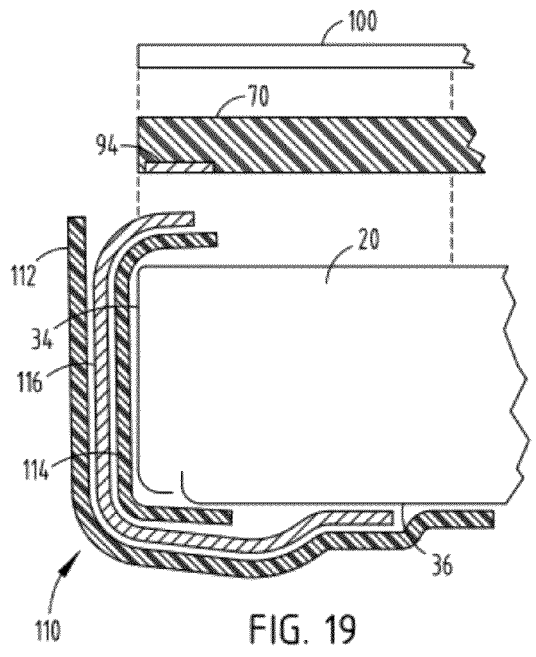
FIG. 19 is a cross-sectional view showing the details of an electrical contact tab that may be used with either the first or second embodiment of the present invention.

One other difference in the construction of the cell 20 when an internal fluid regulating system 50 is utilized is that the cell should be reconfigured to allow electrical connection of both the negative and positive contact terminals of the cell to the control circuit 90 of the actuator. One manner of making this electrical connection is shown in FIGS. 17-19. As shown in FIG. 17, a contact opening 39 is formed in the bottom surface 35 of can 34. As shown in FIG. 18, the negative contact terminal 94 is provided at a bottom of chassis 70 through a via in the chassis so as to be exposed through opening 39. In this manner, an electrical conductor 110 may be electrically connected to cover 36 of cell housing 30 and extend around the outside of cell 20 to the opening 39 while making electrical contact with contact terminal 94. This provides a connection to the negative terminal of the cell. As also shown in FIG. 18, the positive contact terminal 92 provided on chassis 70 may be positioned so as to contact an inner surface of can 34 so as to provide a connection to the positive terminal of the cell. As discussed above, contact terminals 92 and 94 may be electrically connected to a control circuit 90 for controlling the actuator to open and close the valve in response to a detected cell voltage or current draw.

As shown in FIG. 19, electrical conductor 110 may be a tab that includes a foil strip 112 that is disposed between two insulative layers, which prevent a short circuiting of the cell between can 34 and cover 36. A first insulative layer 114 may be disposed between the cell housing 30 and conductive foil 112. This insulative layer 114 may be made of double-sided tape. The second and outer insulative layer 116 may be disposed over the foil and may comprise a strip of single-sided tape. Although this particular external electrical connection is shown with respect to an internal fluid regulating system 50, the same electrical conductor 110 may be applied to provide an electrical path between cover 36 and a similar contact terminal 94 of the external fluid regulating system shown in FIGS. 1-3. In this case, an aperture similar to contact opening 39 could be formed in lid 100 or alternatively the electrical conductor 110 may simply extend between the interface between chassis 70 and can 34 or the interface between chassis 70 and lid 100.

Figure 20:
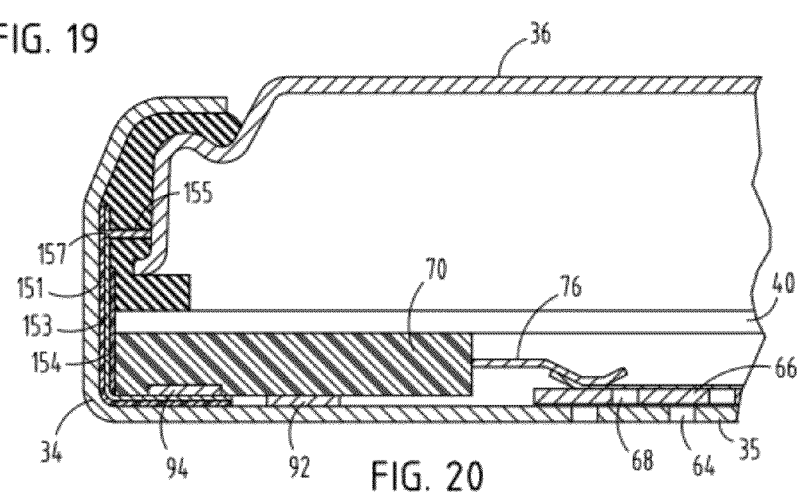
FIG. 20 is a partial cross-sectional view showing an alternative construction of a battery according to the second embodiment of the present invention.
Figure 21:
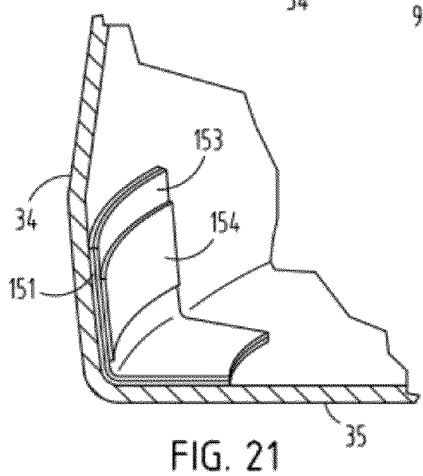
FIG. 21 is a partial perspective view of a modified can that may be used in the construction shown in FIG. 20.
Figure 22:
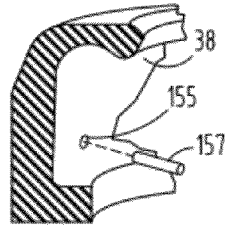
FIG. 22 is a partial perspective view of a gasket that may be used in the construction shown in FIG. 20.
Figure 23:
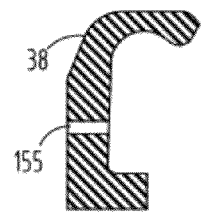
FIG. 23 is a cross-sectional view of a portion of the gasket shown in FIG. 22.

FIGS. 20-23 show yet another manner by which electrical connection may be made between cover 36 and terminal 94 on chassis 70. In this embodiment, a portion of the inner surface of can 34 is coated with three layers of materials as best shown in FIG. 21. The first layer is an electrical insulator layer 151, the second layer is an electrically conductive layer 153 that is applied over insulator layer 151 such that there is no electrical connection between can 34 and conductive layer 153, and the third layer is an electrically insulating layer 154 applied over a portion of conductive layer 153 to insulate the edge of the air electrode 40 from the conductive layer 153. As shown in FIG. 21, layers 151 and 153 extend around the inner bottom corner(s) of can 34 and extend over just enough of the bottom of can 34 so as to physically contact terminal 94 formed on the opposing surface of chassis 70. As mentioned above, chassis 70 may be pressed against the inner bottom surface of can 34 by gasket 38 so that the contact between conductive layer 153 and contact 94 is by way of such pressure. Layers 151 and 153 extend up a sidewall of can 34 between an interface of can 34 and gasket 38. As best shown in FIGS. 20, 22, and 23, gasket 38 may include an aperture 155 through which a rivet or pin 157 may extend. Rivet or pin 157 forms an electrical connection between cover 36 and conductive layer 153 through gasket 38, thereby completing the conductive path between cover 36 and contact 94 on chassis 70. Rivet/pin 157 may be molded in place in gasket 38. Further, more than one such rivet/pin 157 may be used. The rivet/pin 157 may have a length sufficient to allow for gasket compression. Layers 151, 153 and 154 are in the form of a strip as shown in FIG. 21 in order to allow the edge of the air electrode 40 to make electrical contact with the inside surface of the can 34.

Figure 24:
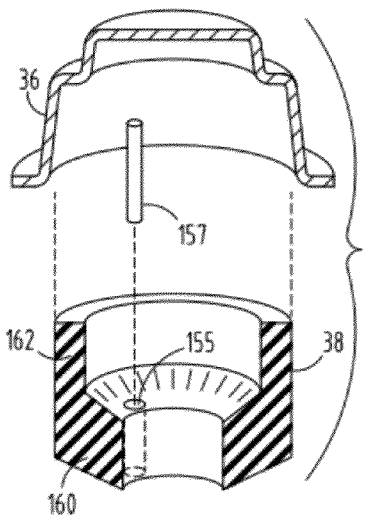
FIG. 24 is an exploded perspective view of a gasket and cover that may be used in a battery constructed in accordance with a third embodiment of the present invention.

FIG. 24 shows yet another embodiment of the present invention whereby an electrically conductive pin 157 is passed vertically downward through an aperture 155 in a flange portion 160 of gasket 38. The pin 157 provides a conductive path from cover 36 to contact terminal 94 (not shown in FIG. 24), which in this embodiment would be on an upper surface of chassis 70. This embodiment provides the advantage that no apertures are needed through a sealing portion 162 of gasket 38. Further, no conductive or insulating layers would need to be applied to the inner surface of the can 34.

Figure 25:
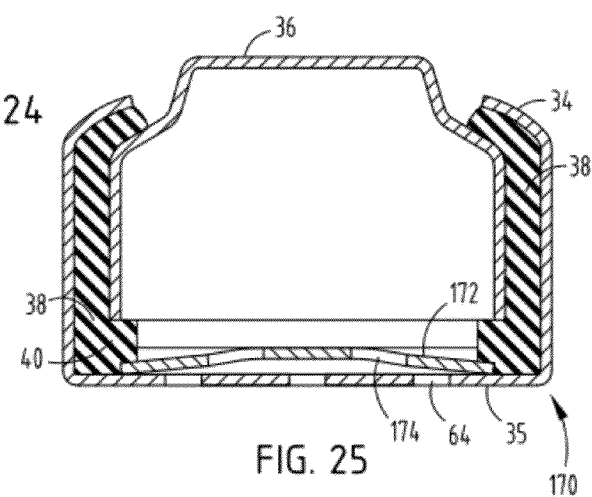
FIG. 25 is a cross-sectional view of a battery constructed in accordance with a fourth embodiment of the present invention.

FIGS. 25-28 show another embodiment of the present invention. According to this embodiment, a different type of valve 170 is used in an internally mounted fluid regulating system. The valve 170 includes a valve plate 172 having a plurality of apertures 174. These apertures, however, are not necessarily sized, shaped and positioned to correspond to fluid entry ports 64 in the bottom of can 34. This is because valve plate 172 is moved between a relative parallel relation with the bottom surface 35 of can 34 (the valve closed position) and a bowed/flexed position as shown in FIG. 25 (the valve open position). In this construction, the apertures 174 in plate 172 do not line up or overlap with any of fluid entry ports 64 so that no fluid may pass into the cell when plate 172 is parallel to the bottom 35 of can 34. To ensure plate 172 is sufficiently pressed against the inner surface of can 34 to seal the cell in a closed position, gasket 38 presses the peripheral edges of plate 172 against can 34.

Figure 26:
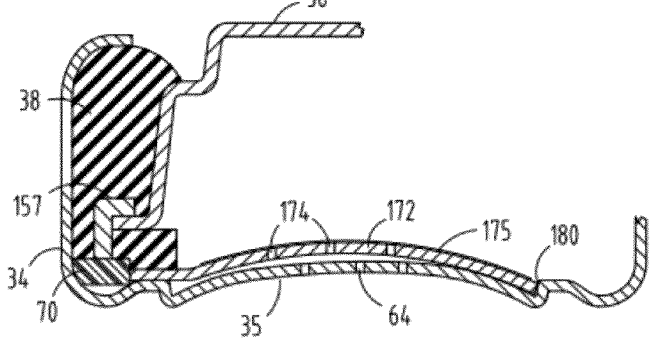
FIG. 26 is a cross-sectional view of a battery constructed in accordance with a fifth embodiment of the present invention.
Figure 27:
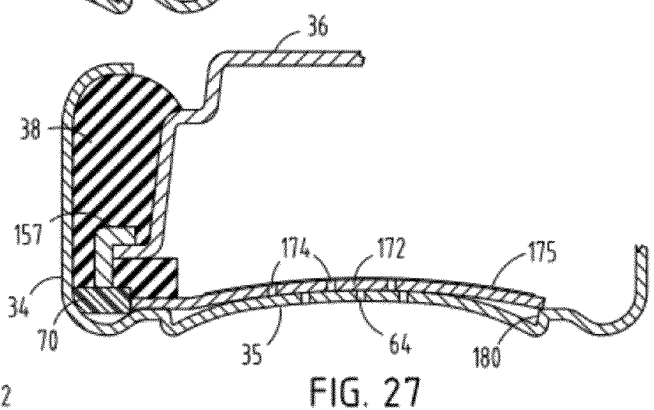
FIG. 27 is a partial cross-sectional view of a portion of the battery shown in FIG. 26, but with the valve in a closed position.
Figure 28:
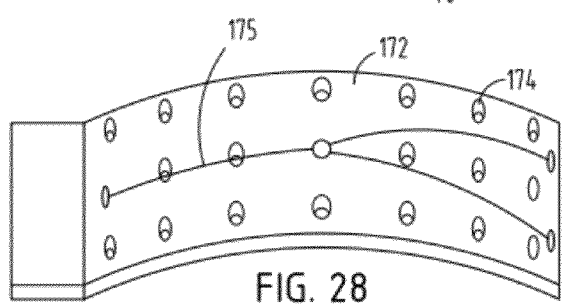
FIG. 28 is a perspective view of a valve member useful in the battery shown in FIG. 26.

As shown in FIGS. 26 and 27, an alternative construction that utilizes a valve plate 172 secured at only one end under gasket 38 and having a latch 180 formed in can bottom 34. FIG. 26 shows the valve in an open position while FIG. 27 shows the valve in a closed position. FIG. 28 shows a perspective view of plate 172 with a SMA actuator 175 secured to plate 172 so as to cause plate 172 to lift and/or flex into the open position. The movement of plate 172 in the open position may be restricted by the air electrode (not shown).

As described above, the fluid regulating system can use electronic controls to operate the valve, based in part on the cell (or battery) voltage. However, a switch can be used to close an electrical circuit through an actuator that changes length to move the valve to an open or a closed position, with the circuit subsequently being broken to stop the flow of current through the actuator when the valve reaches the full open or closed position. This can eliminate the need for more complex control circuits, while still drawing energy from the cell only when needed to open or close the valve. The switch can be on or within the battery itself, or it can be a part of the device in which the battery is used. In one embodiment, the device on/off switch also alternately closes the circuits through opposing actuators to open and close the valve. The operation of such a fluid regulating system is illustrated in FIGS. 33A to 33D.

Figure 33A:
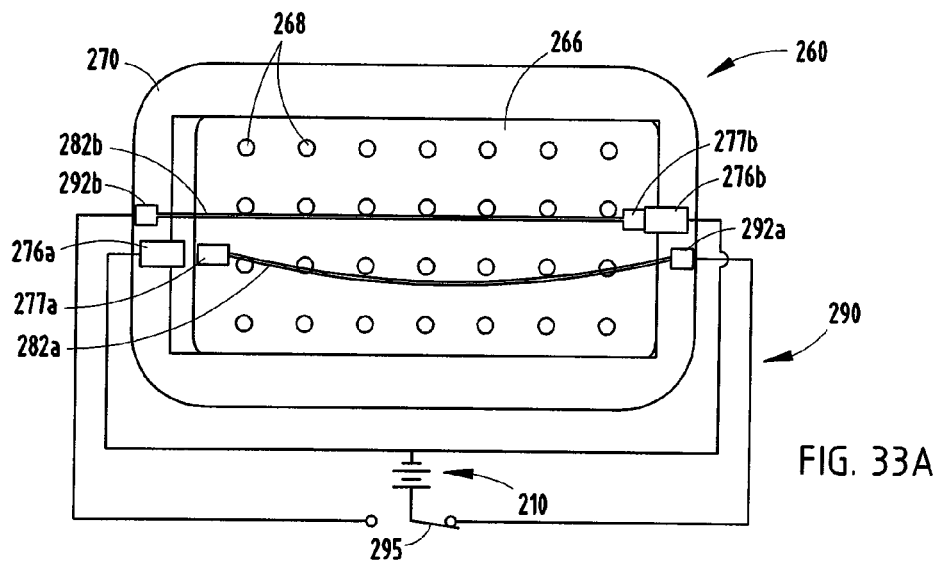
FIG. 33A is a top view of an embodiment of a valve in a closed position and including a schematic diagram of a portion of a control circuit.

FIG. 33A includes a top view of a valve 260 similar to the valve 60 shown in FIG. 3. Valve 260 includes a moveable plate 266 slidably disposed in a chassis 270. Moveable plate 266 is shown in FIG. 33A in the closed position (i.e., with apertures 268 out of alignment with apertures in a fixed plate). SMA actuators 282a and 282b are anchored to the moveable plate 266 and opposite ends of the chassis 270 and are used to pull the plate 266 open and closed, respectively. Actuators 282a and 282b are anchored to plate 266 via flat electrical contacts 277a and 277b, respectively, and to chassis 270 via electrical contacts 292a and 292b, respectively. Flat contacts 277a and 277b are located near opposite ends of the top surface of plate 266 so they will make electrical contact with spring contacts 276a and 276b, respectively, when the plate 266 is in the open and closed positions, respectively. Spring contacts 276a and 276b also serve as contact terminals for making connections to the remainder of a control circuit 290, which is represented schematically. The control circuit includes an on/off switch 295 and the fluid depolarized battery 210 for providing electrical energy to the device. When electrical energy is not required from the battery 210, the switch 295 is in the off position and the valve 260 is in the closed position, as shown in FIG. 33A. Because neither of the circuits including actuators 282a and 282b is closed, no current will flow through them, so the actuators 282a and 282b are at an ambient temperature and in an elongated condition.

Figure 33B:
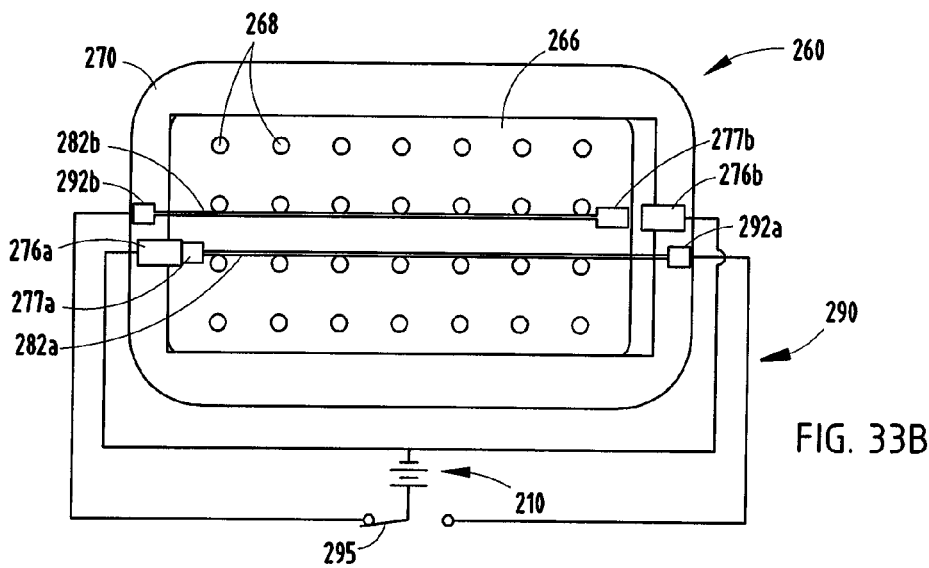
FIG. 33B is a top view of an embodiment of the valve shown in FIG. 33A, but with the valve in an open position.

When the switch 295 is moved to the on position, current flows through actuator 282b, causing it to heat, shorten and pull plate 266 to the left toward the open position. When plate 266 reaches the open position, as shown in FIG. 33B, the electrical connection between contacts 276b and 277b is broken. When the circuit is broken, current ceases to flow through actuator 282b. This accomplishes two things. First, no additional energy is drawn from the battery 210 while the device remains turned on, and second, actuator 282b cools and returns to an elongated condition, as shown in FIG. 33C, so the plate 266 can be moved back to the left when the device is turned off. When the switch 295 is moved to the off position, the circuit that includes actuator 282a is closed, and the flow of current therethrough causes it to shorten and pull the plate 266 to right, toward the closed position. When the plate 266 reaches the closed position, the electrical connection between contacts 276a and 276b is broken, as shown in FIG. 33D, and current ceases to flow through actuator 282a, allowing the actuator to cool and elongate, as shown in FIG. 33A.

Electrical connections to contacts 276a, 276b, 277a and 277b can be made in any suitable manner. For example connections can be made through the chassis 270 or through an interface between the top surface of the chassis 270 and the corresponding surface of an adjacent component, such as a lid covering the chassis 270 and valve 260, to the edges of the fluid regulating system. In another example, electrical connections can be made through suitably placed contacts extending through a lid covering the valve 260. A switch that is part of the cell can be affixed to a suitable surface of the cell and/or fluid regulating system, such as on an exterior surface of a lid. Alternatively, a switch can be located on an outer surface of a multiple cell battery, or within a device in which the battery is installed, with electrical connections to the fluid regulating system made in a suitable manner, such as by welding, soldering or pressure between corresponding contacts. In other embodiments, more than two actuators can be used, in manner similar to the embodiments shown in FIGS. 6, 7 and 8, for example.

Figure 32:
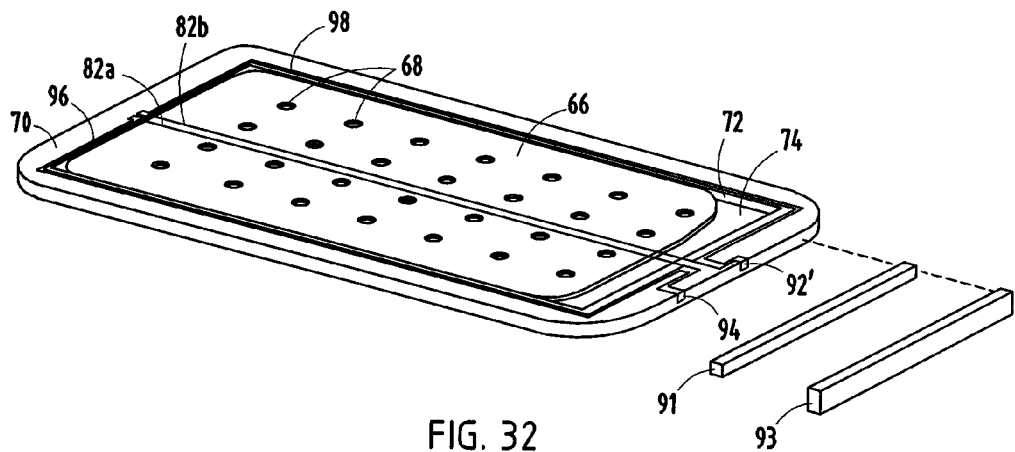
FIG. 32 is an exploded partial perspective view of a portion of a fluid regulating system in accordance with an embodiment of the invention.

Instead of incorporating the control circuit electronics within the fluid regulating system, they can be located externally. This may be desirable in situations where they cannot be conveniently fit internally, for example. In one embodiment the electronics can be mounted on an exterior side of the fluid regulating system, such as within a cap mounted on the side wall of the fluid regulating system and/or the cell, as shown in FIG. 32. FIG. 32 shows a chassis 70, moveable plate 66, SMA wires 82a and 82b, and contact terminals 92' and 94 similar to those in FIG. 4. Unlike FIG. 4, however, the SMA wires 82a and 82b in FIG. 32 are connected directly to the contact terminals 92' and 94, with no intermediate control circuit 90. The control circuit in FIG. 32 is contained in a circuit board 91 secured to the side of the chassis 70 with a cap 93 that protects the circuit board 91. The contact terminals 92' and 94 on the chassis 70 make electrical contact with corresponding terminals on the surface of the circuit board 91. Electrical contact can be made in any suitable manner, such as by pressure contact. The circuit board 91 can have a single substrate layer, or it can be a laminated substrate with two or more layers. The electronics components and electrical connections can include printed or non-printed components, or combinations thereof. Larger components can be disposed in recesses in the surfaces of the circuit board 91 to provide flush fits with the chassis 70 and cap 93. The electrical connections between the circuit board 91 and the cell are not shown, but these connections could also be made through the chassis 70.

Figure 36:
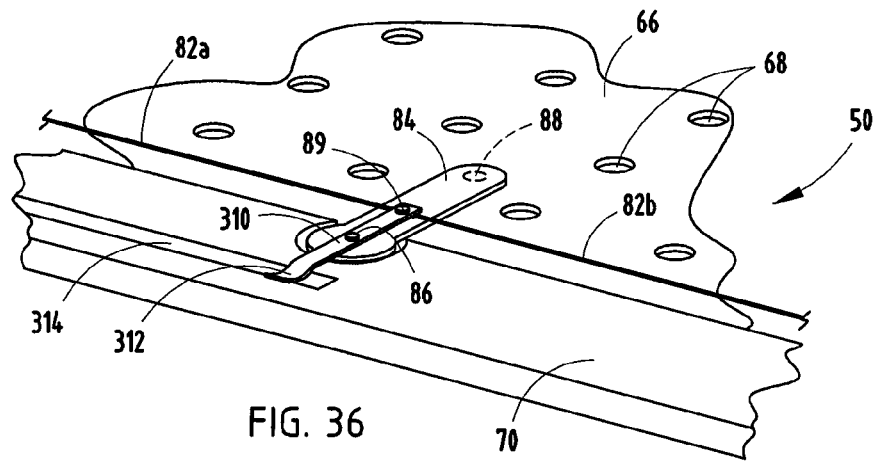
FIG. 36 is a partial perspective view of a fluid regulating system employing a pivoting lever having a sliding electrical contact, according to another embodiment of the present invention.
Figure 37:
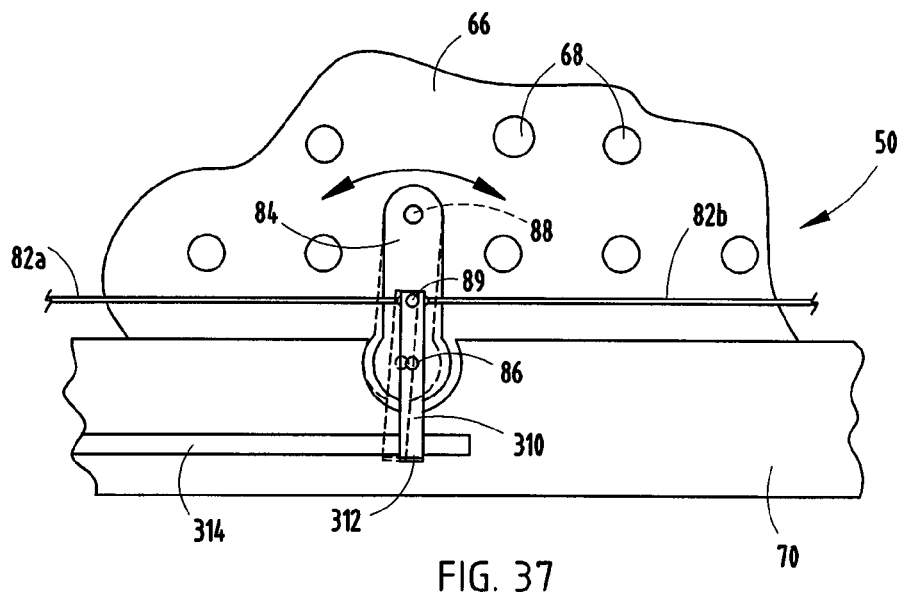
FIG. 37 is a top view of the portion of the fluid regulating system shown in FIG. 36 illustrating rotation of the lever and sliding contact.

The fluid regulating system 50 is further illustrated in FIGS. 36-43 employing an actuator having SMA wires 82a and 82b and a lever 84 for actuating the moving plate 66, according to various additional embodiments. The lever 84 illustrated in FIGS. 36 and 37 is shown pivotally connected at pivot pin 86, near one end of lever 84, to chassis 70 such that lever 84 rotates about pivot pin 86 in response to SMA wires 82a and 82b to leverage movement of plate 66. Actuator pin 88 near the opposite end of lever 84 engages plate 66.

Connected on the top surface of lever 84 is an electrical conductor 310 having a sliding spring contact 312 provided at one end. SMA wires 82a and 82b are connected to the electrical conductor 310 at attachment point 89. The sliding spring contact 312 is in electrical contact with an electrical circuit trace 314 provided on the top surface of chassis 70. The sliding spring contact 312 is spring biased downward to forcibly contact the top surface of circuit trace 314 to maintain adequate electrical connection therewith as lever 84 is rotated about pivot pin 86. In one embodiment, the circuit trace 314 may be connected to electrical ground, such that the electrical current applied to one of SMA wires 82a and 82b is conducted onto the conductor 310 to circuit trace 314 and to ground.

Figure 38:
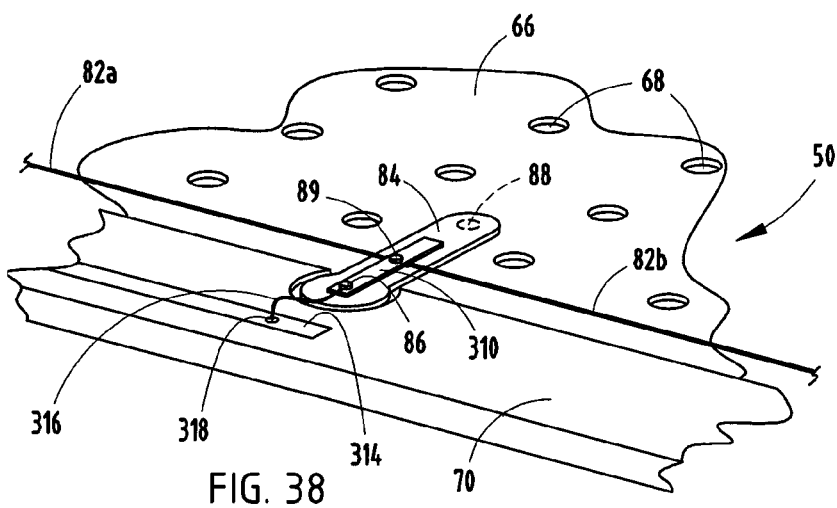
FIG. 38 is a partial perspective view of a fluid regulating system employing a pivoting lever having an alternate electrical connection, according to another embodiment.

In FIG. 38 the lever 84 is shown employing an electrical wire 316 connected between conductor 310 and circuit trace 314, in lieu of the sliding spring contact. One end of the wire 316 is connected to conductor 310 at pivot pin 86 and the other end is connected to circuit trace 314 at connector 318 to complete the circuit path to ground. While circuit trace 314 is described herein connected to electrical ground, it should be appreciated that electrical current could be supplied to circuit trace 314 and a grounded path connection may be provided via one of the SMA wires 82a and 82b, to conduct electrical current in the reverse direction.

Figure 39:
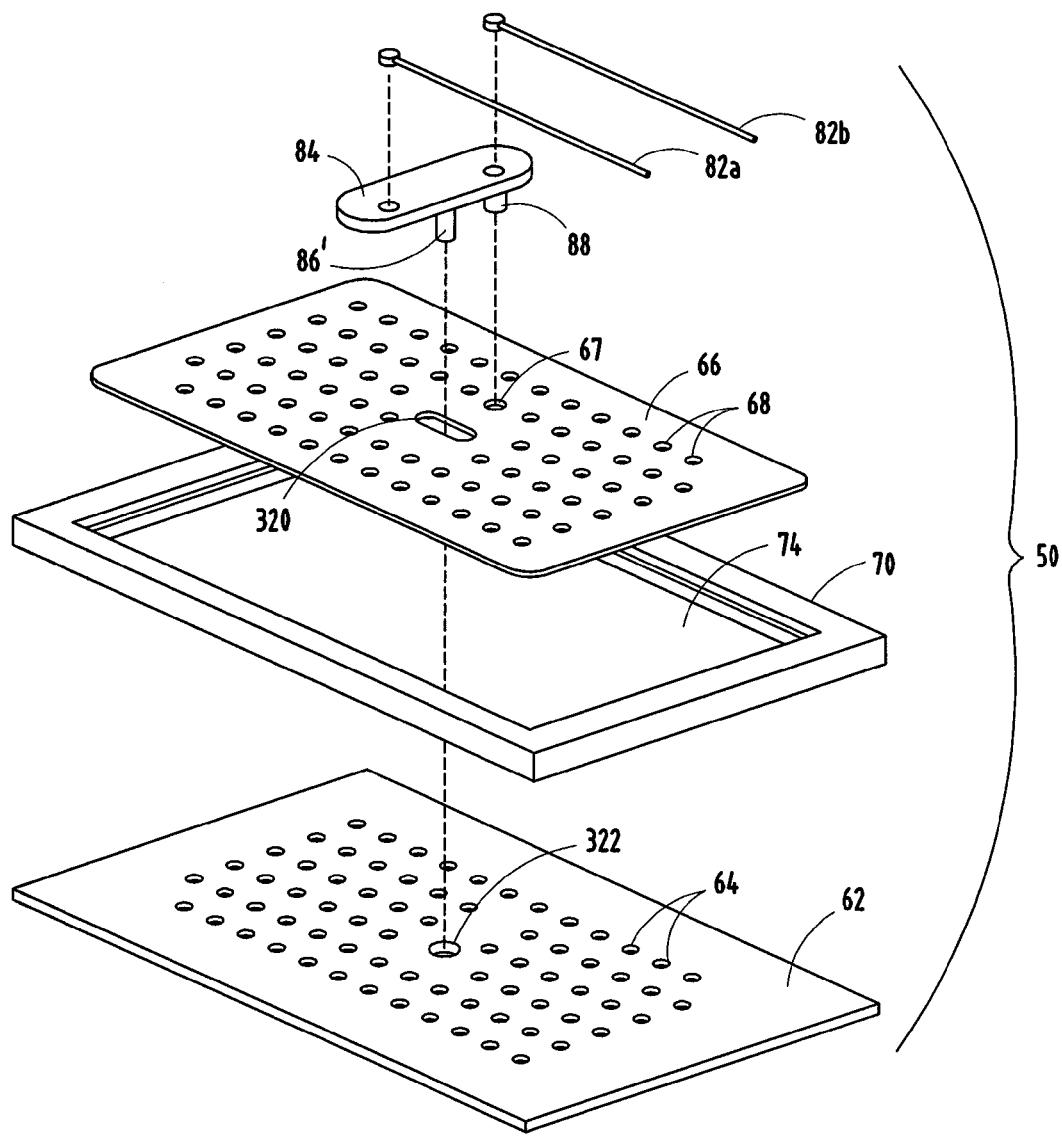
FIG. 39 is an exploded perspective view of a fluid regulating system employing a rotational lever, according to another embodiment of the present invention.
Figure 40:
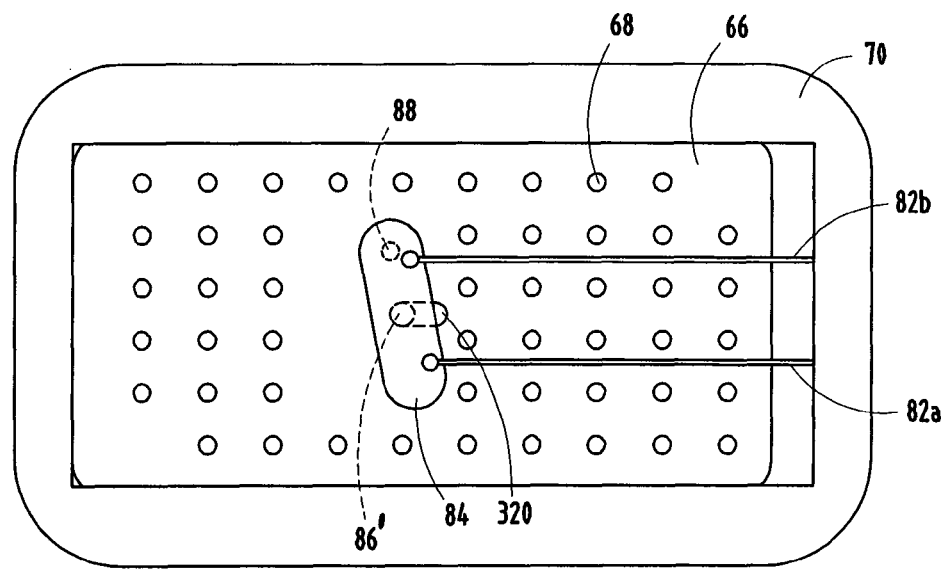
FIG. 40 is a top view of the fluid regulating system of FIG. 39 shown in the open valve position.
Figure 41:
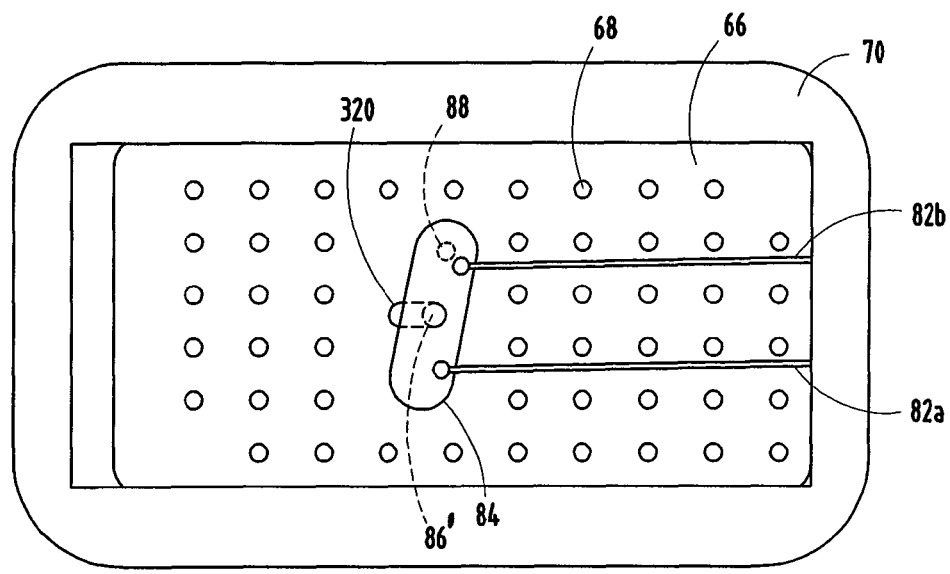
FIG. 41 is a top view of the fluid regulating system of FIG. 39 shown in the closed valve position.

Referring to FIGS. 39-41, a fluid regulating system 50 is shown employing a rotating lever 84, according to another embodiment of the present invention. In this embodiment, lever 84 employs a first central elongated pivot pin 86' that extends downward through an elongated slot 320 in moving plate 66 and into engagement with opening 322 in stationary plate 62. Opening 322 allows rotation of central pivot pin 86' and prevents lateral movement of the pin 86'. Lever 84 has a second pin 88 displaced by a distance from the central pivot pin 86' that engages opening 67 in moving plate 66. The SMA wires 82a and 82b are shown connected to lever 84 at locations displaced from the central pivot pin 86'. When actuated, the SMA wires 82a and 82b apply torque to rotate lever 84 either clockwise or counterclockwise about central pivot pin 86'.

As seen in FIG. 40, with SMA wire 82a electrically energized, SMA wire 82a heats up and contracts to pull lever 84 to rotate in a counterclockwise direction such that lever 84 rotates about central pivot pin 86' and causes moving plate 66 to slide to the left as shown. As seen in FIG. 41, electrically energizing the SMA wire 82b heats SMA wire 82b which contracts and pulls lever 84 to rotate in a clockwise direction about center pivot pin 86' such that the moving plate 66 slides to the right. It should be appreciated that as the lever 84 is rotated clockwise or counter-clockwise, the moving plate 66 slides right or left by way of actuator pin 88, and the central pivot pin 86 does not interfere with movement of plate 66 due to the presence of the elongated slot 320.

Figure 42:
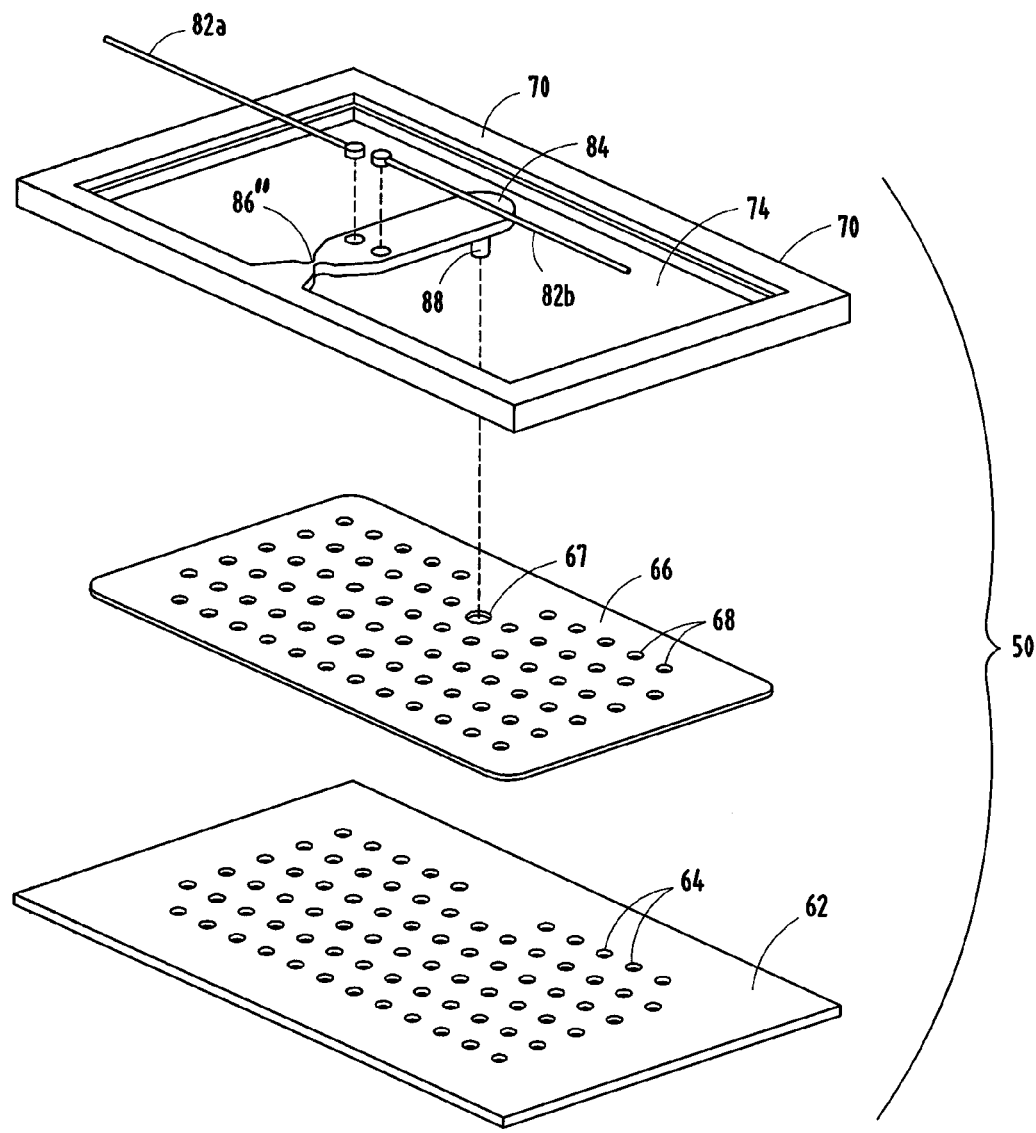
FIG. 42 is an exploded perspective view of a fluid regulating system employing a lever that pivots about a flexible hinge, according to another embodiment.
Figure 43:
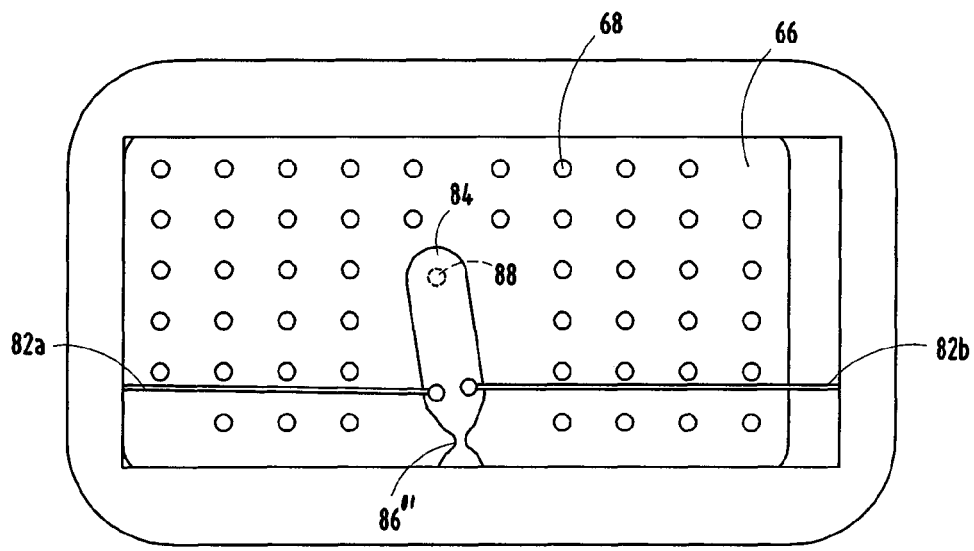
FIG. 43 is a top view of the fluid regulating system of FIG. 42 shown in the open valve position.
Figure 44:
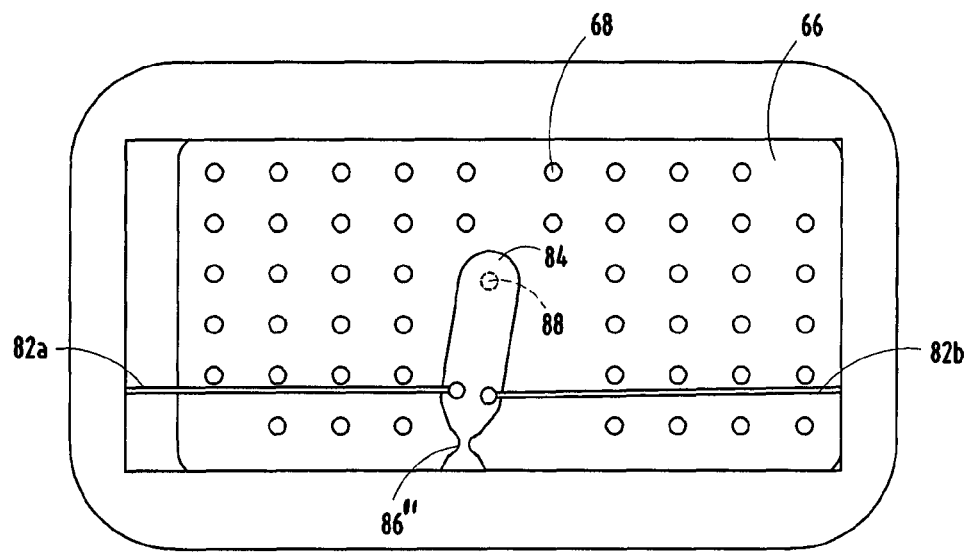
FIG. 44 is a top view of the fluid regulating system of FIG. 42 shown in the closed valve position.

A fluid regulating system 50 is further illustrated in FIGS. 42-44 employing a lever 84 that is formed integrally as a part of the chassis 70 having a flexible hinge 86". In this embodiment, the lever 84 may be formed of the same material (e.g., epoxy) integrally formed as part of chassis 70, prior to forming the overmold body 300 or may be formed as part of the overmold body 300. The lever 84 is formed having actuator pin 88 extending downward into engagement with opening 67 in moving plate 66. SMA wires 82a and 82b are connected to the lever 84. Lever 84 has a reduced width portion 86" that serves as a flexible hinge such that the lever 84 bends about the flexible hinge 86" responsive to SMA wires 82a and 82b so as to move actuator pin 88 and plate 66 to the left, as shown in FIG. 43, and to the right, as shown in FIG. 44, to open and close the valve. It should be appreciated that the flexible hinge 86" is sufficiently thin and made of material that allows for sufficient movement of lever 84 when SMA wires 82a and 82b are energized.

Figure 45:
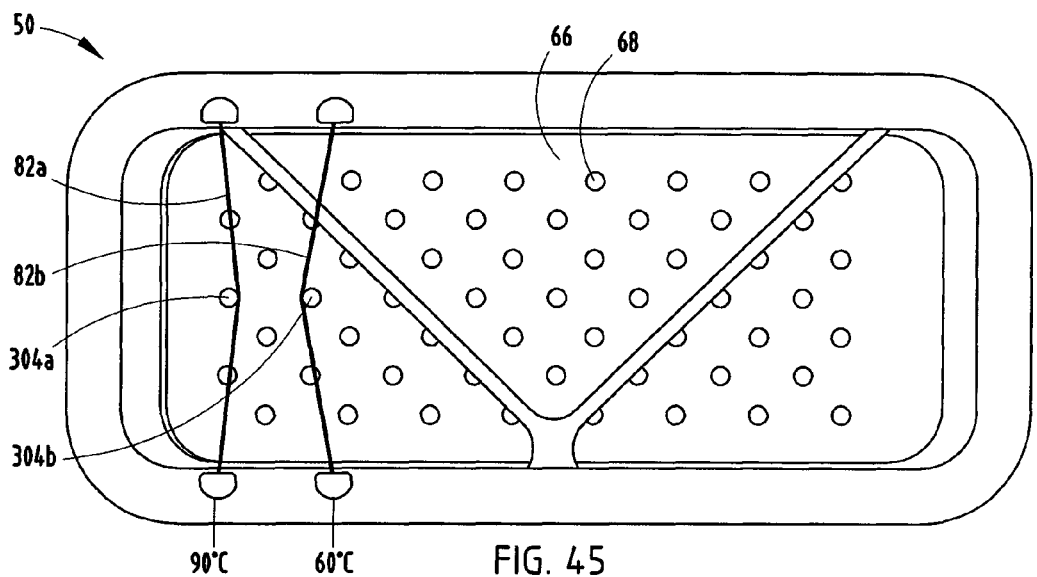
FIG. 45 is a top view of a fluid regulating system employing a passive closure actuator, according to one embodiment.
Figure 46:
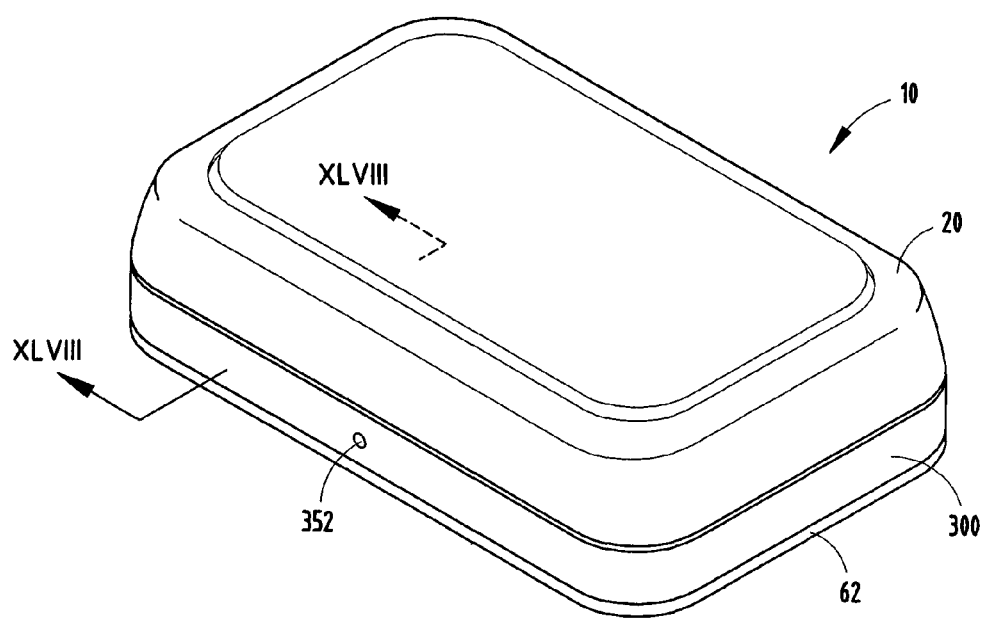
FIG. 46 is a perspective view of a battery having a fluid regulating system with a pressure release fluid path provided in the chassis, according to another embodiment.
Figure 47:
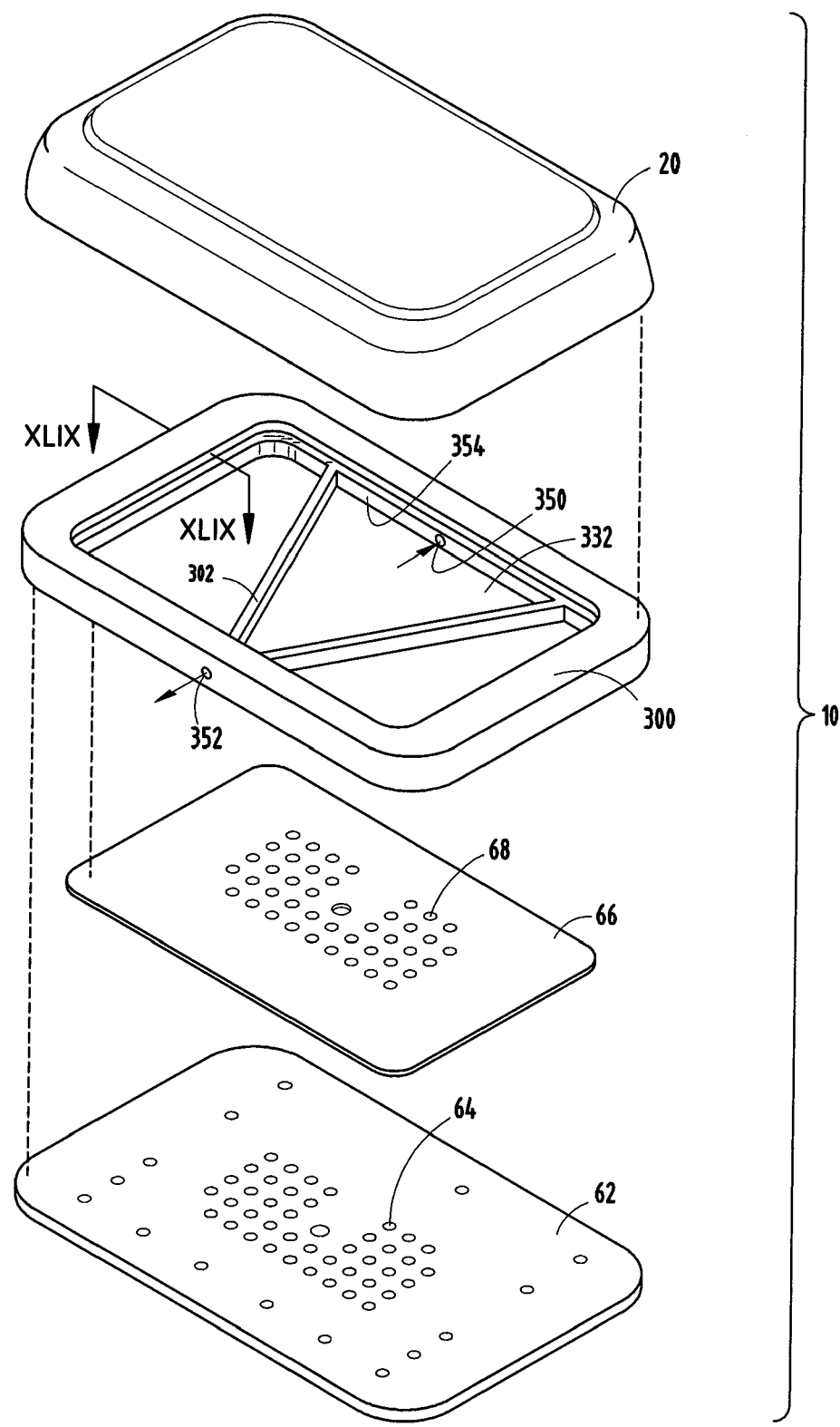
FIG. 47 is an exploded perspective view of the battery having a fluid regulating system with a pressure release path shown in FIG. 46.
Figure 48:
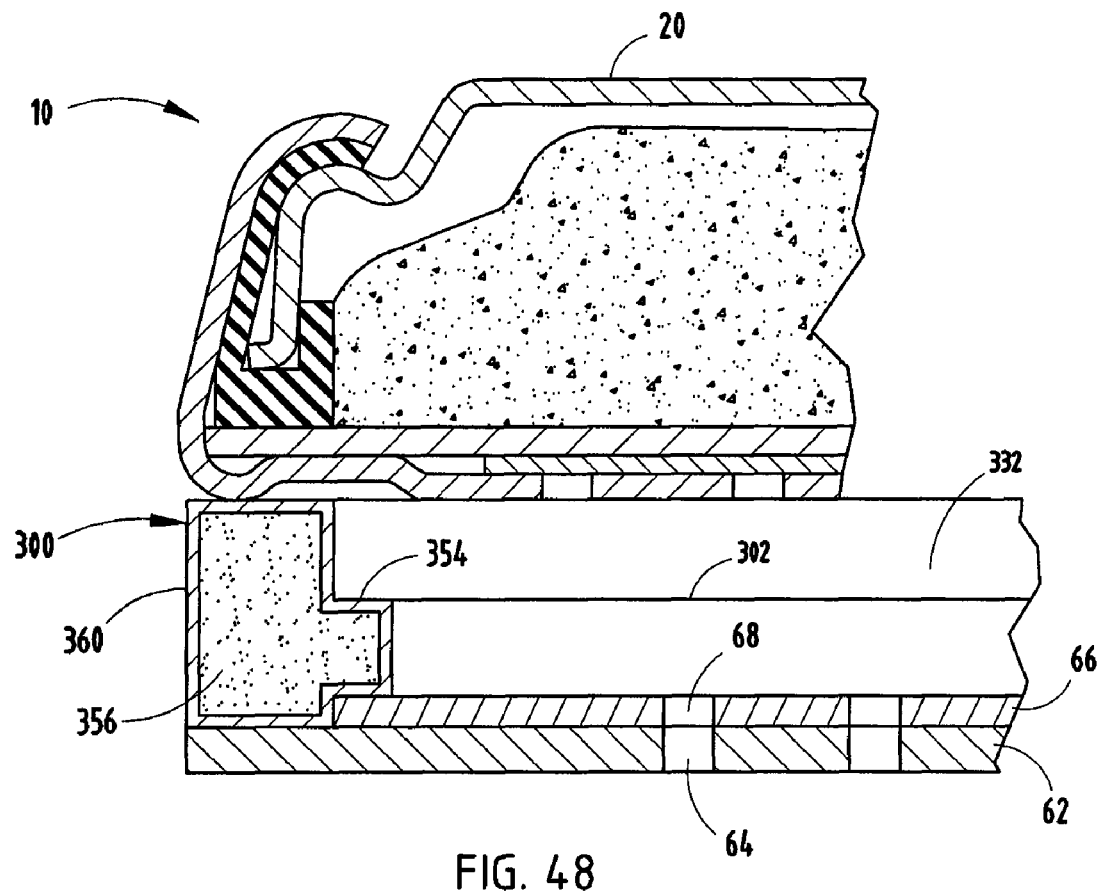
FIG. 48 is a cross-sectional view of a portion of the battery and fluid regulating system taken through lines XLVIII-XLVIII of FIG. 46.

Referring to FIG. 45, a fluid regulating system 50 is illustrated for regulating fluid (e.g., air) to a battery by controlling the opening and closing of the valve and further includes a passive temperature closure according to a further embodiment of the present invention. SMA wire 82a may be electrically energized to heat up and contract and thereby move moving plate 66 to the open valve position (as shown in FIG. 45) via actuator pin 304a. SMA wire 82b may be electrically energized to heat up and contract and thereby move moving plate 66 to the closed valve position via actuator pin 304b. The valve may therefore be actively opened and closed in response to electric current applied to either SMA wires 82a or 82b. Additionally, the SMA wires 82a and 82b are selected with different actuation temperatures to provide a passive temperature closure of the valve, according to one embodiment of the present embodiment. The SMA wires 82a and 82b have an unbalanced actuation temperature to achieve the desired passive closure of the valve. Thus, the moving plate 66 is moved to the closed valve position upon experiencing a predetermined temperature limit.

In the embodiment shown and described in FIG. 45, the SMA wire 82a is configured with a first actuation temperature of about 90° C., whereas the SMA wire 82b is configured with a lower second temperature of about 60° C. When electrically energized, SMA wire 82a heats up and contracts to apply force to actuate moving plate 66 to the open position upon reaching the higher first temperature. Similarly, SMA wire 82b may be electrically energized to heat up and contract to actuate the valve to move moving plate 66 to the closed position at the lower second temperature. The first temperature is greater than the second temperature such that the SMA wire 82b closes the valve when the temperature of SMA wire 82b reaches the lower second temperature. It should therefore be appreciated and in addition to actively opening and closing the valve based on electrical current applied to the SMA wires 82a and 82b, the SMA wire 82b forces the moving plate 66 to the closed valve position when the ambient temperature first reaches the lower second temperature. If the temperature of the environment continues to rise to the higher second temperature, the SMA wire 82a will not apply sufficient force to change the position of the valve from its closed position.

SMA wires 82a and 82b may include commercially available SMA components. One example of a 60° C. actuation SMA wire is a 0.102 mm (0.004 inch) diameter 60° C. wire, commercially available from Flexinol. One example of a 90° C. actuation SMA wire is a 0.076 mm (0.003 inch) diameter 90° C. wire, commercially available from Flexinol. In the example given, the 60° C. SMA wire will remain contracted until the temperature has dropped back down to about 40° C., thereby resulting in a temperature hysteresis.

The fluid regulating system 50 employing the unbalanced temperature SMA wires advantageously provides a passive method for closing the valve to prevent fluid ingress to the battery cell above a predetermined temperature. By closing the fluid regulating system 50 at a predetermined temperature, such as 60° C., degradation of the battery may be minimized or prevented. Additionally, by moving the valve closed upon reaching a temperature limit, such as 60° C., opening of the valve at high temperatures is prevented. It should be appreciated that the predetermined temperature for closing the valve may be greater than 45° C., and more particularly, may be set at about 60° C.

According to one embodiment, the SMA wires 82*a* and 82*b* may be configured having different sizes to generate different actuation forces such that the SMA wire 82*b* generates a greater actuation force than the actuation force generated by SMA wire 82*a*. In an exemplary embodiment, SMA wire 82*b* has a greater cross-sectional area, such as a greater diameter, than SMA wire 82*a*. With a larger cross-sectional area, SMA wire 82*b* applies a greater closing force to the moving plate of the valve in the event that the ambient temperature reaches the higher first temperature. It should be appreciated that the SMA wires 82*a* and 82*b* may be circular in cross-section and the second SMA wire has the larger diameter. According to other embodiments, the SMA wires 82*a* and 82*b* may have other cross-sectional shapes, such as oval, square or rectangular shapes, with the second SMA wire 82*b* having a greater dimension, resulting in a greater cross-sectional area, which results in a greater actuation force than the first SMA wire 82*a*. In another embodiment, SMA wires 82*a* and 82*b* may have both different cross-sectional areas and different phase transition temperatures, such that SMA wire 82*b* will generally be actuated first as the ambient temperature increases, which results in the valve remaining closed even as the ambient temperature rises above the higher phase transition temperature of SMA wire 82*a*.

Referring to FIGS. 46-50, a fluid consuming battery 10 is shown having a battery cell 20 and a fluid regulating system 50 having a fluid passage through the overmold body 300 that provides for pressure equalization between the cell 20 and the outside environment, according to two embodiments. In the embodiments shown, a chassis is generally illustrated by the overmold body 300 having a central opening 332 and an inward extending ledge 354. A fluid consuming battery cell 20, such as an air cell, is connected on the top surface of the overmold body 300. The fixed plate 62 with fluid entry ports 64 is connected to the bottom surface of overmold body 300 and moving plate 66 with ports 68 is disposed between the lower wall of inward extending ledge 354 and fixed plate 62 so that plate 66 may be moved relative to plate 62.

In the embodiment shown in FIGS. 46-49, the overmold body 300 is generally illustrated having a first port, also referred to as an inlet 350, located generally between the cell 20 and the moving plate 66, and in fluid communication with opening 332 and cell 20. The overmold body 300 also has a second port, also referred to as an outlet 352, provided on the outside of the overmolded material leading to the outside environment. The overmolded body 300 is manufactured to have a nonporous outside layer 360 and a porous internal volume that provides the fluid passage 356. The nonporous outside layer 360 is generally non-permeable to fluid, particularly air, and may include an epoxy, according to one example. The porous internal volume provides for a pressure equalization fluid flow passage 356 that extends from the inlet 350 to the outlet 352. The porous internal volume may include an air permeable material, such as microporous polytetrafluoroethylene material, or a non-woven porous material that allows restricted air flow at a low diffusion rate through the passage 356. Alternatively, or in addition, the fluid passage 356 may include empty void volume providing a sufficiently restricted passage that allows air flow at a low diffusion rate. The fluid passage 356 advantageously allows air to slowly pass from the inlet 350 to outlet 352, however, the fluid passage 356 may allow fluid to pass in either direction between the inlet 350 and outlet 352 to provide pressure equalization between the cell 20 and the outside ambient environment.

The inlet 350 of fluid passage 356 is in fluid communication with the open volume between the battery cell 20 and valve plates 66 and 62. A pressure differential existing between gases within the battery cell 20 and outside environment may allow gas to migrate through the fluid passage. When the battery cell 20 generates gas, the gas may migrate through the restricted fluid passage 356 to the outside environment to prevent compromising the seal between the valve plates 66 and 62. Contrarily, gas may be permitted to flow from the outlet 352 to the inlet 350, but is generally restricted such that air is not freely supplied to the battery cell 20 so that the cell 20 is generally not discharged at a high rate when the valve is closed.

Figure 49:
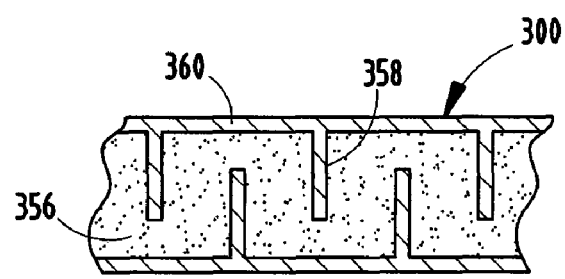
FIG. 49 is a cross-sectional view of the chassis taken through lines XLIX-XLIX of FIG. 47 further illustrating baffles forming a tortuous fluid passage.

According to one embodiment, the fluid passage 356 has an air diffusion rate that would result in a loss of no more than 10 percent of the cell capacity per year at room temperature due to moisture gain or loss. It should be appreciated that the porous volume of the fluid passage 356 may include a membrane that is generally porous to gases to provide a tortuous or restricted air flow passage, but does not allow free unrestricted flow of fluid into the cell 20. According to one embodiment, the porous volume 356 may include a tortuous fluid passage 356, such as that provided by baffles 358 as shown in FIG. 49. The baffles 358 essentially increase the effective length of the airflow passage 356 through the overmolded body 300, thus increasing the net effective fluid flow path length. According to other embodiments, the tortuous fluid flow path may employ a honeycomb pattern that is generally porous to allow excess gas to escape from the cell 20 to the outside environment, while minimizing the amount of air from entering the cell 20.

Figure 50:
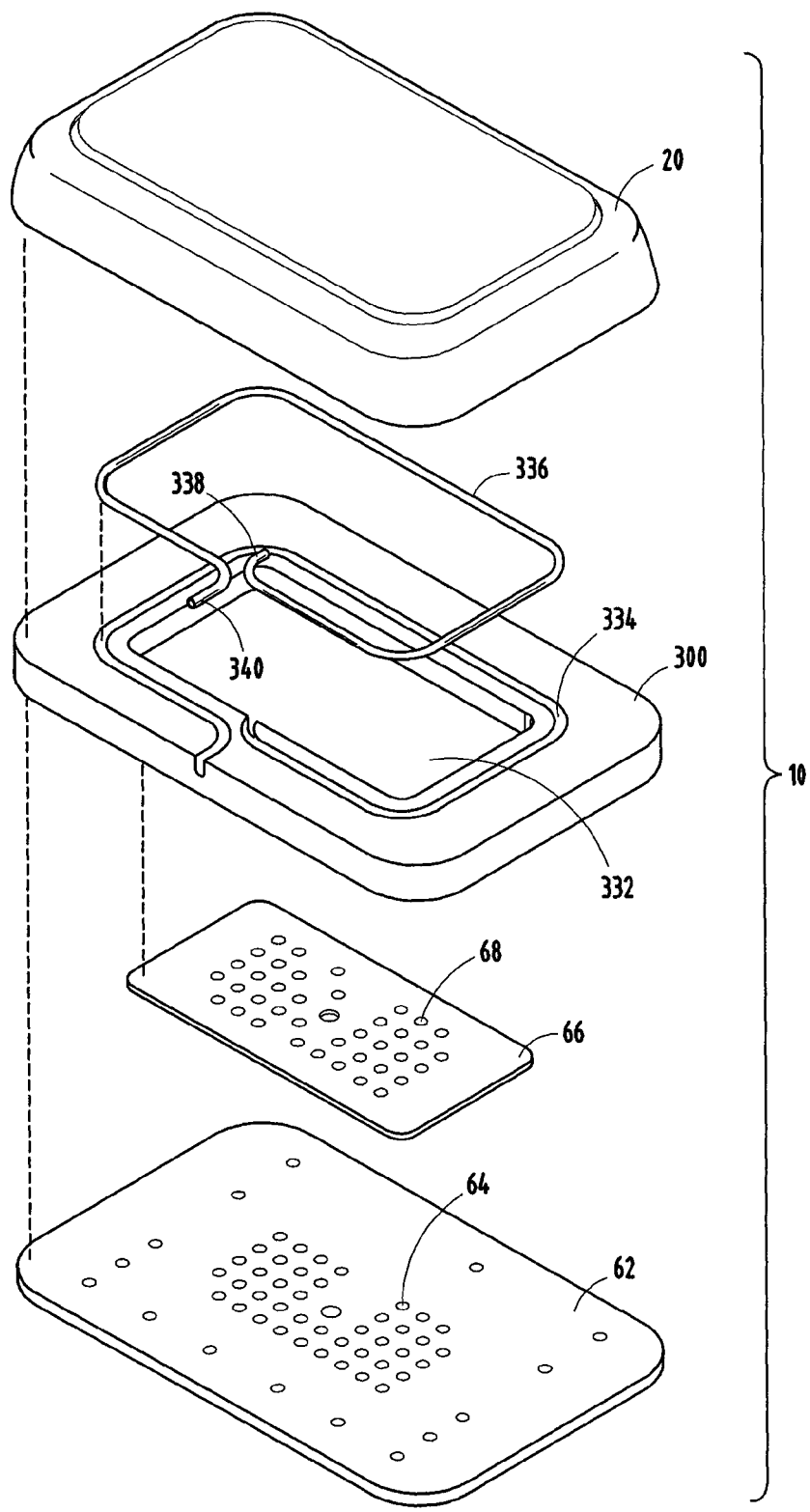
FIG. 50 is an exploded perspective view of a battery having a fluid regulating system with a pressure relief fluid path, according to another embodiment.

In the embodiment shown in FIG. 50, the top surface of the overmold body 300 has a slot 334 formed therein in a generally serpentine shape that extends from the inside opening 332 in a rectangular shape about the opening 332 by about 360° leading to the outside surface of the ovenmold body 300. Disposed within the slot 334 is a hollow tube 336 having a general configuration adapted to be sized and fit within slot 334. The tube 336 has a first port, also referred to as an inlet 338, at one end in fluid communication with the inside opening 332 of the overmold body 300 and cell 20, and has a second port, also referred to as an outlet 340, at the other end in fluid communication with the outside environment. The fixed plate 62 is shown connected on the bottom surface of the overmold body 300. The moving plate 66 is disposed below ledge 354 and is adjacent to and in sealed relationship with the fixed plate 62, such that plate 66 is moveable relative to plate 62 to open and close the valve.

The tube 336 provided within overmold body 300 provides a fluid passage that extends between the inlet 338 and outlet 340 such that fluid released from the battery cell 20 is able to pass through the fluid passage of tube 336 to the outside environment. The fluid inlet 338 is located in position in the volume of opening 332 between the battery cell 20 and the fixed and moving plates 62 and 66, according to one embodiment. Thus, the extended length and small diameter of tube 336 provides a tortuous fluid passage that allows fluid to escape from the cell 20 at a sufficiently low diffusion rate, while sufficiently restricting air ingress to the cell 20 due to the low diffusion rate. In one embodiment, tube 336 has a sufficiently restricted inner diameter of less than 0.5 mm and an effective length of at least 200 mm. According to another embodiment, the slot 334 may be covered and utilized as the fluid passage in lieu of use of the tube 336.

In the disclosed embodiments of FIGS. 46-50, a pressure differential existing between the gases within the battery cell 20 and the ambient outside environment in which the cell 20 is exposed may cause a disruption, which may lead to subsequent failure of the fluid barrier. Thus, the intended primary seal barrier between the valve plates 62 and 66 can be compromised, which would potentially allow uncontrolled ingress and egress of fluid, such as water, oxygen, hydrogen, and carbon dioxide, which could result in the unacceptable loss of battery shelf-life. The pressure equalization fluid passage 336 or 356 provided in overmold body 300 allows fluid such as gases to migrate through the fluid passage to egress and ingress. By providing an appropriately sized hole of a suitable length, the fluid passage allows for the egress of gas, such as hydrogen generated within a metal-air cell, while prohibiting excess ingress of oxygen and carbon dioxide to the cell 20.

Referring to FIGS. 51-54, a fluid regulating system 50 is generally illustrated employing a moving plate 366 that rotates relative to a stationary plate 362, according to two embodiments. In the embodiment shown in FIGS. 49 and 50, the fluid regulating system 50 employs a rotatable plate 366 assembled to a chassis 370 and aligned on top of a stationary plate 362. The stationary plate 362 has a pair of openings 364 and moving plate 366 has a pair of openings 368 that align in fluid communication with each other to control fluid entry to a battery cell (not shown). Stationary plate 362 remains fixed to chassis 370. The rotatable plate 366 rotates about a pivot pin 371, between a closed valve position shown in FIG. 51 and an open valve position shown in FIG. 52. In the closed valve position, the openings 364 and 368 are not aligned so as to prevent fluid from flowing into a battery cell. In the open valve position, the openings 364 and 368 are aligned to allow fluid (e.g., air) to enter the battery cell.

Figure 51:
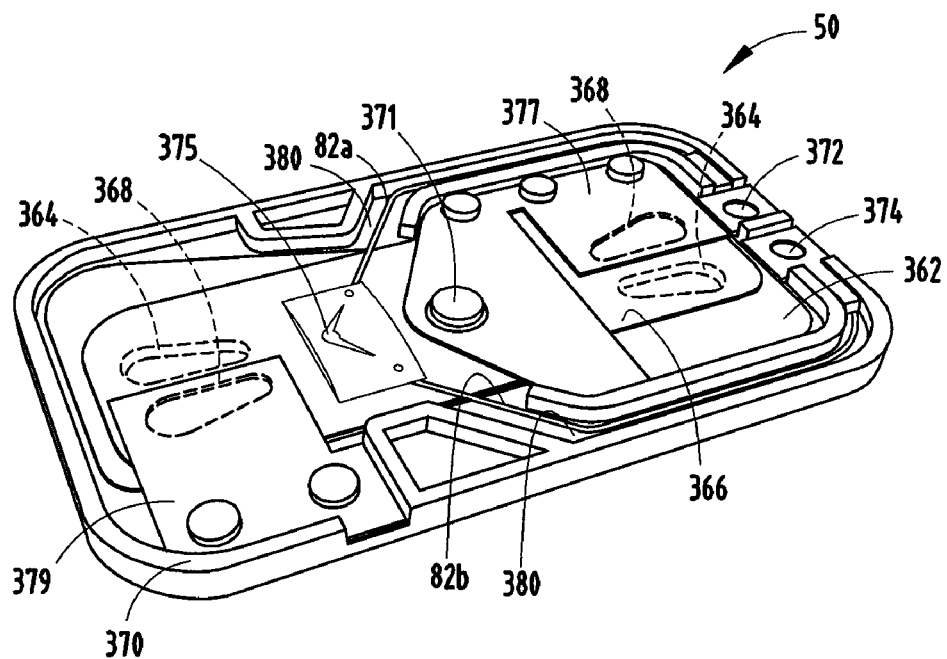
FIG. 51 is a perspective view of a fluid regulating system employing a rotational moving plate shown in a closed valve position, according to another embodiment.
Figure 52:
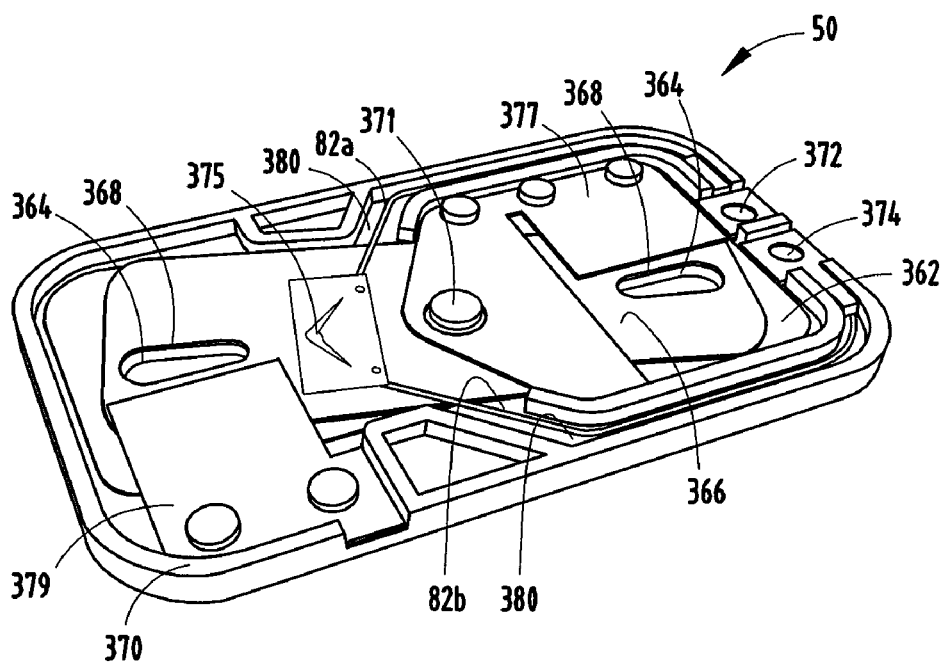
FIG. 52 is a perspective view of the fluid regulating system of FIG. 51 shown in the open valve position.

The fluid regulating system 50 illustrated in the embodiment of FIGS. 51 and 52 employs SMA wires 82a and 82b connected to the chassis 370 at crimps 372 and 374. The SMA wires 82a and 82b are further attached to rotatable plate 366 at a crimp 375. The SMA wires 82a and 82b extend within a channel or slot 380 between the pair of crimps 372, 374 and crimp 375, and the SMA wires 82a and 82b are connected to the rotatable plate 366 at a distance from pivot pin 371 so as to cause plate 366 to rotate between the open and closed valve positions. In effect, the rotatable plate 366 with connection to the SMA wires 82a and 82b has an integrally formed lever that leverages force applied by SMA wires 82a and 82b at a distance from the pivot pin 371 to rotate rotatable plate 366. Additionally, springs 377 and 379 are provided on top of the rotatable plate 366 to provide a retaining force to retain rotatable plate 366 in a sealed relationship with the stationary plate 362 in the vicinity of the holes 364 and 368. Is should be appreciated that more or less fluid entry holes may be provided in the rotatable and stationary plates 366 and 362 as should be evident to those skilled in the art.

Figure 53:
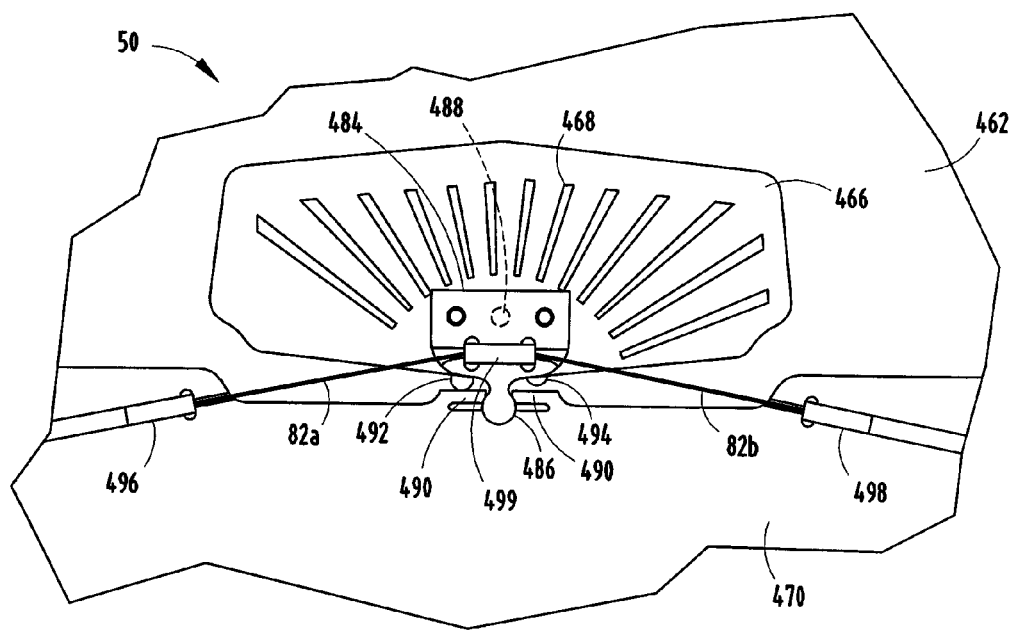
FIG. 53 is a top view of a fluid regulating system employing a rotational moving plate in the open valve position, according to a further embodiment.
Figure 54:
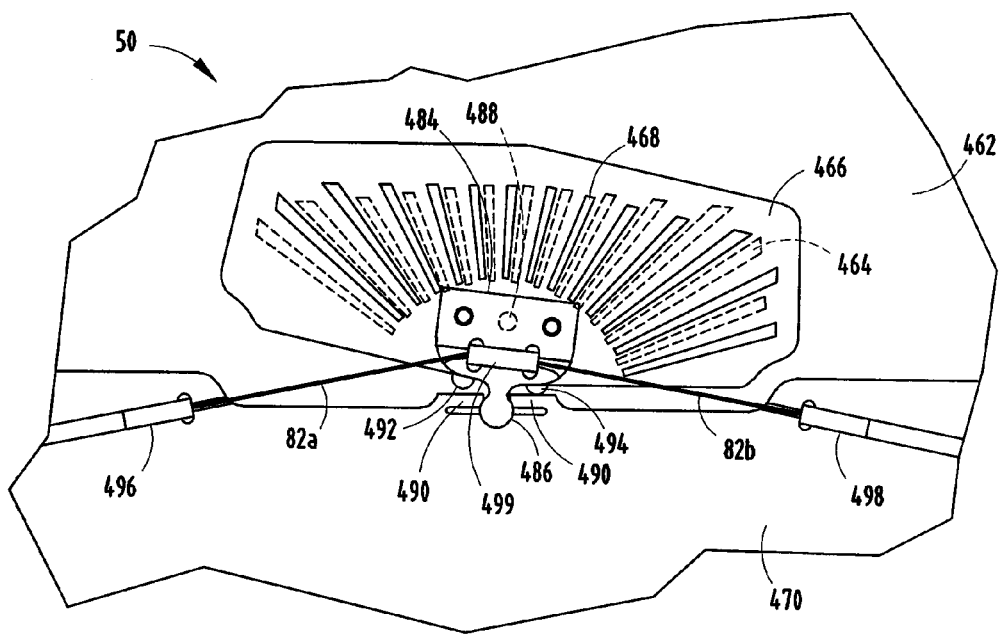
FIG. 54 is a top view of the fluid regulating system of FIG. 53 shown in the closed valve position.

Referring to FIGS. 53 and 54, a fluid regulating system 50 is generally illustrated having a rotatable plate valve assembly, according to a further embodiment. In this embodiment, a lever 484 is shown connected to a rotatable plate 466 having generally tapered slot openings 468. Below the rotatable plate 466 is a stationary plate 462 which likewise includes similarly shaped tapered slot openings 464 that may align with the openings 468 in the open valve position to allow fluid entry into a battery cell (not shown). With plate 462 fixed, rotatable plate 466 rotates clockwise and counterclockwise to close and open the valve The lever 484 is shown having a pivoting hip 486 generally disposed within a frame plate, such as the chassis 470. The lever hip 486 is generally round in shape and is engaged within the frame plate 470 by way of resilient arms 490. Arms 490 can help to hold the round hip 486 in place to provide a low degree of variability in the location of actuator pin 488, thereby providing low variability in alignment of openings 464 and 468. The hip 486 allows lever 484 to rotate from a counterclockwise position with one shoulder 492 in contact with plate 470 as seen in FIG. 53 into a position with the other shoulder 494 in contact with plate 470 as seen in FIG. 54 in response to actuation provided by SMA wires 82a and 82b. Shoulder 492 and 494 serve as end of travel stops and may be omitted in other embodiments. The SMA wires 82a and 82b are shown connected to the frame plate 470 by way of a pair of crimps 496 and 498, and are further connected together within lever 484 via another crimp 499. It should be appreciated that the crimp 499 may include an electrical ground path or the ground path may be provided through an alternative conductive path.

In operation, the fluid regulating system 50 of the present embodiment is actuated by electrically energizing one of the SMA wires 82a or 82b to rotate lever 484 to move plate 466 between open and closed valve positions. It should be appreciated that the tapered slots 464 and 468 provide gearing of the actuation from SMA wires 82a and 82b following the increase in stroke as the radius from the hip 486 increases.

The rotational valves illustrated in FIGS. 51-54 provide for rotation of the moveable plate relative to the stationary plate. It should be appreciated that, alternately, linear actuation of the plate may be achieved or a combination of linear movement and rotation movement of the moving plate relative to the stationary plate may be achieved, according to other embodiments. Further, while the valve has been described in connection with a moving plate and a stationary plate, it should be appreciated that the valve may include one or two moving plates, such that one plate moves relative to the other plate to open and close the valve.

Referring to FIGS. 55-58, a fluid regulating system 50 is illustrated having a friction reduction medium 502 including round members 500 disposed between the fixed and moving valve plates 62 and 66, according to one embodiment. In this embodiment, the fluid regulating system 50 is shown including a chassis 70 having an annular body portion 72, an inward extending ledge 71 and an opening 74 in which the moving valve plate 66 is disposed. The inward extending ledge 71 is shaped and sized to contact the peripheral elongated upper side edges of moving valve plate 66 while providing excess space at the shorter side of the plate 66 so that it may slide linearly along an axis parallel with its longest dimension. Connected to the bottom side surface of chassis 70 is the fixed valve plate 62. The fixed valve plate 62 may be adhered, fastened, or otherwise connected to the bottom surface of chassis 70.

Moving plate 66 has a plurality of apertures 68 that align with a plurality of apertures 64 in fixed plate 62, when the valve is in the open position. Plate 66 is slidable within opening 74 of chassis 70 to move between the open and closed valve positions. When in the closed valve position, the apertures 68 and 64 are not aligned such as to prevent fluid from passing through apertures 64 and 68 and reaching a fluid consuming battery cell. It should be appreciated that a fluid consuming battery cell may be attached to the top surface of the chassis 70 similar to the assembly of battery cell 20 on overmold body 300 shown in FIGS. 47 and 48 with one or more fluid entry ports of the battery cell 20 in fluid communication with the valve to receive fluid (e.g., oxygen), as described herein, according to one embodiment.

The fluid regulating system 50 includes a friction reduction medium 502 disposed between the moving valve plate 66 and the fixed valve plate 62. The fluid reduction medium 502 includes a plurality of round members, shown and described in an exemplary embodiment as spherical members 500. The round members can have other shapes, such as generally straight or tapered cylinders. The friction reduction medium 502 also includes a lubricating layer 69 made of oil. The spherical members 500 are disposed within the lubricating oil 69 and serve to enable the moving valve plate 66 to more readily slide relative to the fixed valve plate 62. Thus, the friction reduction medium 502 enables the valve plates to move relative to each other to open and close the valve in a manner that requires less force by the actuators which are shown as SMA components 82a and 82b according to one embodiment. Additionally, the spherical members 500 serve to provide a controlled standoff height to maintain a minimum separation distance between the moving plate 66 and fixed plate 62.

The lubricating oil 69 serves both as a seal to prevent fluid leakage through the valve and as a lubricant to reduce friction. It should be appreciated that the use of lubricating oil 69 enhances the sealing characteristic of the valve without requiring complex and expensive machinery of the valve plates 62 and 66 to otherwise provide a good seal. The controlled height gap maintained by the spherical members 500 provides a fixed distance between the sliding plate 66 and stationary plate 62 to further help control the leak rate and fluid thickness of the oil.

Figure 55:
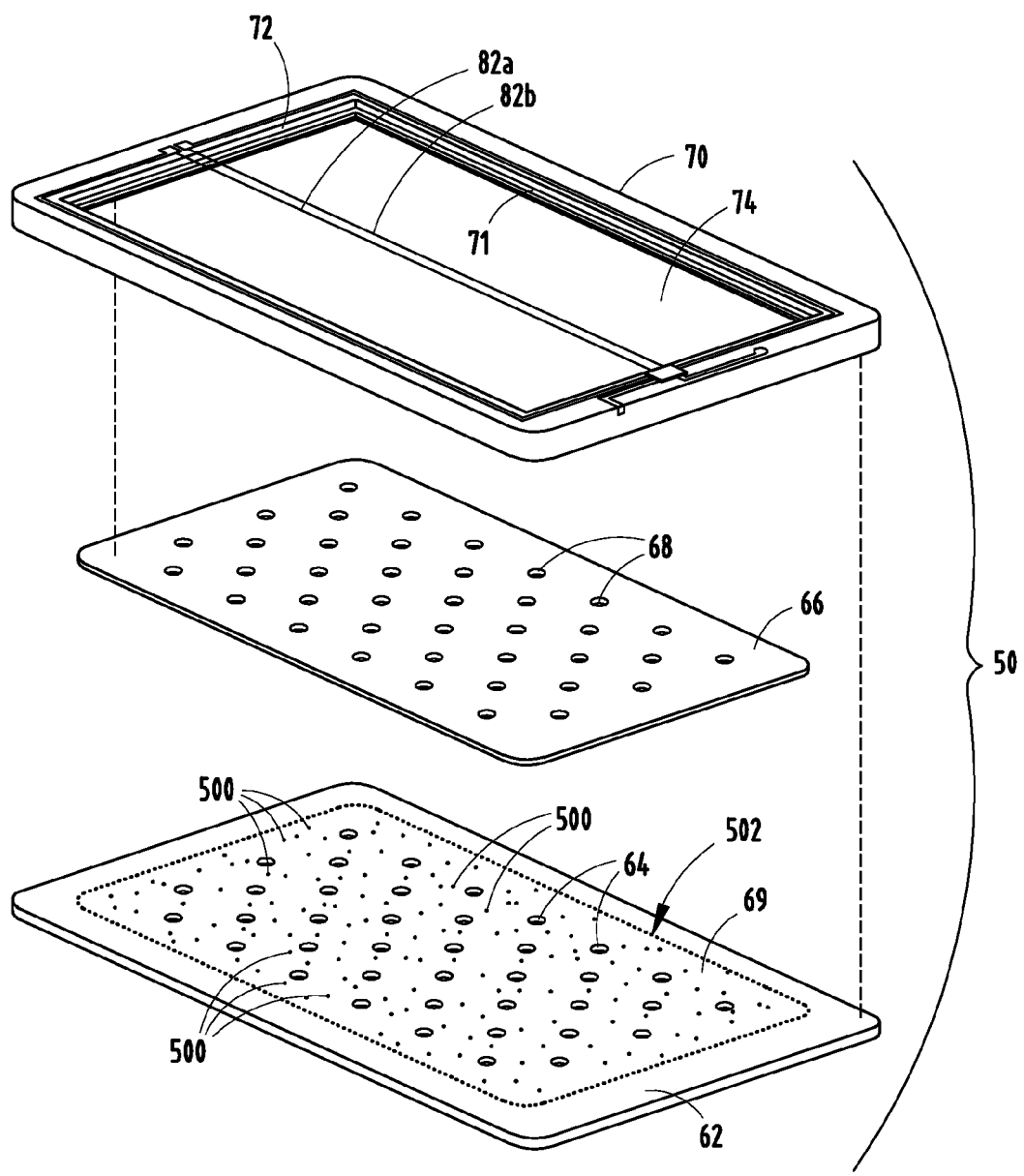
FIG. 55 is an exploded view of a fluid regulating system having a friction reduction medium including spherical members disposed between the valve plates, according to one embodiment.
Figure 56:
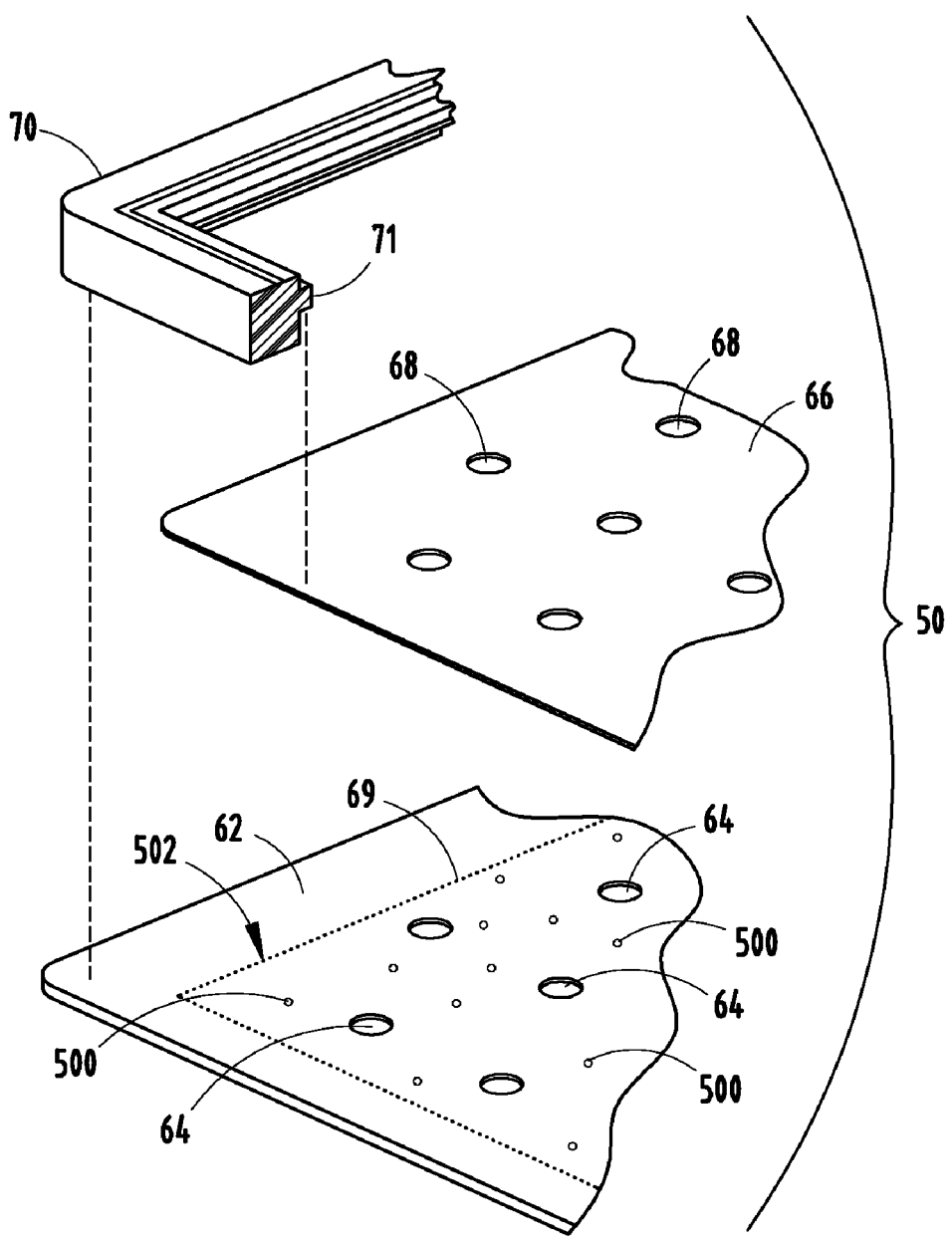
FIG. 56 is an enlarged exploded view of a portion of the fluid regulating system shown in FIG. 55, further illustrating the friction reduction medium.

The fluid reduction medium 502 is shown in FIGS. 55 and 56 applied on top of the fixed valve plate 62. However, it should be appreciated that the friction reduction medium 502 may be applied to the top surface of the fixed plate 62, the bottom surface of the moving plate 66, or to both surfaces during the assembly of the fluid regulating valve. As seen, the spherical members 500 are dispersed throughout the lubricating oil 69 such that spherical members 500 are generally present in different regions of the interface area between the valve plates 62 and 66. The spherical members 500 may be randomly dispersed within the lubricating oil 69 as shown, or may be positioned in a desired pattern.

According to one embodiment, the lubricating oil 69 may include a low vapor pressure oil including, for example, a silicone compound or a fluorocarbon. An example of a suitable silicone oil is a silicone diffusion pump oil, such as a Dow Corning series 700 silicone diffusion pump oil (e.g., grade 702, 704 and 705). One type of a suitable low vapor pressure oil is a perfluoroalkylether oil such as a KRYTOX® 100 series grade GPL oil (e.g., KRYTOX® 102 grade GPL oil), commercially available from DuPont de Nemours International S.A., Antwerp, BE. Other known lubricating oils 69 may be employed, according to further embodiments. Preferably the vapor pressure of the oil 69 is from about $10^{-2}$ to $10^{-2}$, more preferably from about $10^{-5}$ to $10^{-11}$, torrs. Preferably the lubricating oil 69 is a low viscosity oil, with a viscosity from about 5 to 200 centistokes, more preferably from about 10 to 180 centistokes, at 20° C. as determined according to ASTM D445.

The spherical members 500 can be made of any material that is relatively inert in the oil 69 and in the types of environments to which the battery is expected to be exposed. Examples of suitable materials include plastics such as polyethylene and polypropylene, glasses, ceramics and metals such as stainless steel. Preferred materials include polypropylene beams, ceramic beads, glass beads and stainless steel beads. It should be appreciated that other materials may be employed to form the round members 500 of the friction reduction medium 502 according to further embodiments. Preferably the round members 500 are uniform in size to provide the desired distance between plates 62 and 66 with a minimum amount of material.

Figure 57:
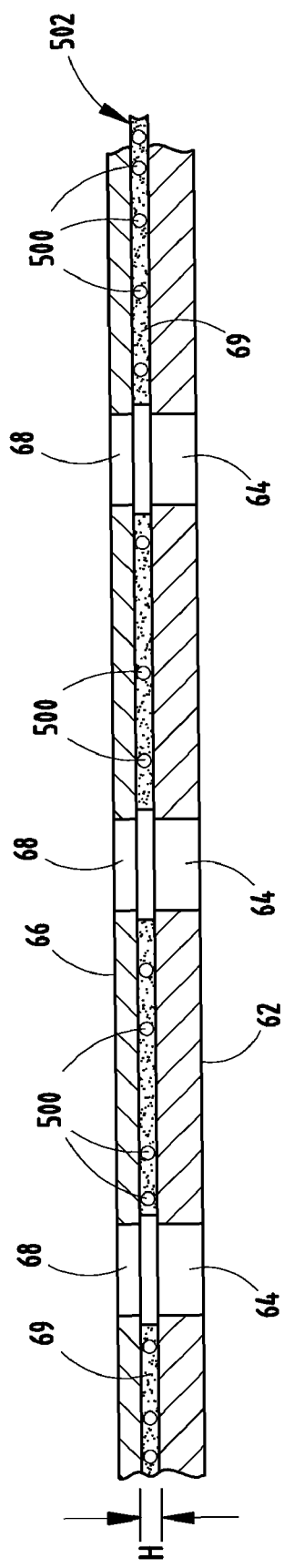
FIG. 57 is a partial cross-sectional view of the valve in FIG. 55 showing the valve plates in the open position.
Figure 58:
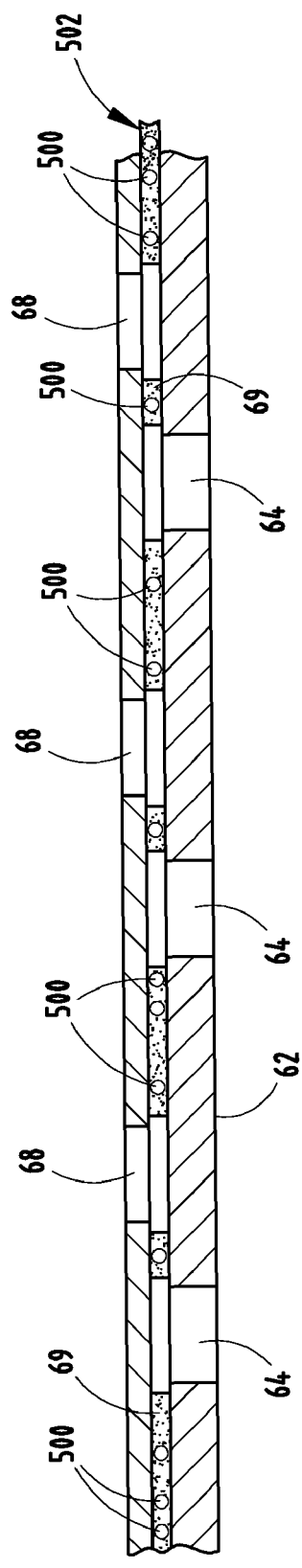
FIG. 58 is a partial cross-sectional view of the valve in FIG. 55 showing the valve plates in the closed position.

With particular reference to FIGS. 57 and 58, the valve plates 66 and 62 of the fluid regulating system 50 are illustrated in the open valve position in FIG. 57 to allow fluid entry to a fluid consuming battery cell, and in the closed valve position in FIG. 58 to prevent fluid entry to the cell. As seen in FIG. 57, with the movable plate 66 is slidably moved to the open position such that apertures 68 of plate 66 are aligned with apertures 64 of plate 62, fluid is allowed to pass through the fluid regulating device. The friction reduction medium 502 made up of the lubricating oil 69 and spherical members 500 is disposed between the movable plate 66 and fixed plate 62. Due to the surface tension properties of the lubricating oil 69, the lubricating oil 69 provides a fluid seal and remains disposed between the two valve plates 66 and 62 such that oil 69 is not present above or below apertures 68 or 64. By actuating the moving plate 66 to the closed position, as seen in FIG. 57, the apertures 68 and 64 are no longer aligned with each other such that fluid flow therethrough is prevented. Despite movement of moving plate 66 relative to fixed plate 62, the lubricating oil 69 will effectively stay out of the apertures 68 and 64 due to the surface tension and will instead flow around the apertures 68 and 64 such that lubricating oil 69 and spherical members 500 of the friction reduction medium are always located between non-open portions of valve plates 66 and 62. Thus, oil 69 also forms a seal between the plates 62 and 66 to prevent fluid leakage.

In the exemplary embodiment shown, the fluid reduction medium, including particularly the spherical members 500, have a height H that provides a minimum stand up distance between moving plate 66 and fixed plate 62. The spherical members 500 may roll or rotate during movement of moving plate 66 and, thus, act as ball bearings to reduce friction and hence the force that is needed to actuate and move the moving plate 66. Accordingly, less battery energy is required to actuate the moving valve plate 66. The spherical members 500 also provide a minimum stand off distance between the two valve plates. The spherical members 500 prevent the gap between the plates 66 and 62 from continually decreasing, particularly as the valve is cycled. This prevents the loss of lubricating oil 69 which prevents degradation of the seal and reduces friction. The low viscosity lubricating oil 69 further enhances the lubricating characteristics particularly with the spherical members 500 providing a controlled height incorporated into the friction reduction medium 502.

According to one embodiment, the spherical members 500 are formed as small spheres, also referred to as microspheres, having a diameter in the range of one micron to two hundred microns. In a more specific embodiment, the microspheres have a diameter of about 6-20 microns. In one embodiment, the amount of spherical members 500 disposed in the lubricating fluid 69 is in the range of about one to ten percent by weight of the lubricating oil 69.

According to one example, the fixed valve plate 66 has a thickness of about ten mils (254 microns), as compared to the fixed valve plate 62 having a thickness of about twenty mils (508 microns). In this example, the spherical members 500 of the friction reduction medium 502 have a diameter of about one third mil (8.5 microns). It should be appreciated that other size round members 500 may be employed in the friction reduction medium 502 between valve plates having various thicknesses.

While spherical members 500 are illustrated herein in accordance with the fluid reduction medium 502, it should be appreciated that other round members 500 may be employed to provide friction reduction and standoff distance between the valve plates 66 and 62. For example, the round members 500 may include cylinders positioned to roll or rotate in the direction of movement of the moving plate 66 relative to fixed plate 62. Additionally, it should be appreciated that the round members 500 may be held in position relative to the valve plates 66 and 62 by disposing the round members 500 in shaped surface contours. According to one embodiment, detents such as in the form of semicircles, may be incorporated on either or both the top surface of the fixed plate 62 and the bottom surface of the moving plate 66. The detents would receive the round members 500 and retain the round members 500 at a particular location relative to one of the valve plates. According to another example, detents may be implemented as slots formed in either or both of the top surface of the fixed plate 62 and bottom surface of the moving plate 66 to maintain the position of one or more of the round members 500.

Accordingly, the friction reduction medium 502 employing the round members 500 advantageously reduces the friction between the movable plate 66 and fixed plate 62, such that less energy is required from the battery to power the actuator to activate the moving plate 66. Additionally, the round members 500 provide the standoff distance between the valve plates 62 and 66 to provide enhanced lubricating and sealing characteristics of the low viscosity oil by maintaining the proper distance to achieve enhanced valve operation. An enhanced fluid manager valve is thereby realized by employing the round members 500, according to the present invention.

Although the present invention has been described above with respect to single batteries having a single cell, aspects of the present invention may apply to batteries having multiple cells, and battery packs having multiple batteries. For example, the fluid regulating system may be completely or partially disposed in a housing of a battery pack so as to selectively open and close a valve that allows air or another fluid to pass into the battery pack housing. In this case, separate fluid regulating systems would not be needed for each battery. Further, the fluid regulating system could be powered from any one or group of the batteries or all of the batteries within the battery pack or from another battery outside the battery pack.

The fluid regulating system may also be disposed completely or partially within a device that is powered by the battery, batteries, or battery pack or otherwise provided separate from the battery, batteries, or battery pack. For example, the valve could be a pre-packaged module that serves a variety of multi-cell pack sizes. So there may be advantages to packaging the valve, valve power supply and controls separately from the fluid consuming cells.

The combination of a fluid consuming battery and a fluid regulating system can include a module containing all or a portion of the fluid regulating system into which one or more replaceable fluid consuming batteries are inserted. This allows reuse of at least part of the fluid regulating system, thereby reducing the cost per battery to the user. The module can include one or more fluid inlets and can also include internal channels, plenums or other internal spaces that provide a passageway for fluid to reach the battery. The module and battery can be held together in any suitable manner, including the use of electrical contacts that are part of the module that cooperate with the corresponding electrical contacts that are part of the battery to prevent inadvertent separation of the module and battery. For example, the electrical contacts on the module can be in the form of projecting blades that snap into slots in the battery case that contain the battery electrical contacts. The blades can be held in the slots by any suitable means, such as by interference fit, one or more springs, a mechanical locking mechanism and various combinations thereof. The module and battery dimensions, shapes and electrical contacts can be configured to allow mating of the module and battery in only the proper orientations in order to assure proper electrical contact and prevent battery reversal. The module, the battery or both can have external contact terminals for making proper electrical contact with a device in which the combined battery and module are installed. In some embodiments the battery can be replaced without removing the module from the device.

While the invention has been described in detail herein in accordance with certain preferred embodiments thereof, many modifications and changes therein may be affected by those skilled in the art without departing from the spirit of the invention. Accordingly, it is our intent to be limited only by the scope of the appending claims and not by way of the details and instrumentalities describing the embodiments shown herein.

What is claimed is:

1. A battery comprising:
   at least one fluid consuming cell comprising;
      a cell housing comprising one or more fluid entry ports for the passage of a fluid into the cell;
      a first fluid consuming electrode disposed within said cell housing;
      a second electrode disposed within said cell housing; and
   a fluid regulating system comprising:
      a first plate disposed in fluid communication with the one or more fluid entry ports, said first plate having at least one plate aperture;
      a second plate disposed adjacent to the first plate and having at least one plate aperture, said first and second plates forming a valve;
      an actuator for moving the first plate relative to the second plate to open and close the valve to regulate the passage of fluid into the cell; and
      a friction reduction medium disposed between the first plate and the second plate, wherein the friction reduction medium comprises a plurality of round members, wherein the plurality of round members maintain a minimum separation distance between the first plate and the second plate and rotate during movement of the first plate relative to the second plate, and wherein the plurality of round members comprises spherical members each having a diameter in the range of 1 to 200 microns.

2. The battery of claim 1, wherein the friction reduction medium further comprises a lubricating oil, wherein the plurality of round members are disposed within the lubricating oil.

3. The battery of claim 2, wherein the lubricating oil comprises a low vapor pressure oil with a vapor pressure from $10^{-2}$ to $10^{-12}$ torrs.

4. The battery of claim 1, wherein the friction reduction medium comprises spherical members of at least one percent by weight of the lubricating oil.

5. The battery of claim 1, wherein the fluid regulating system further comprises a frame supporting the first plate relative to the second plate.

6. The battery of claim 1, wherein the first plate comprises a moving plate and the second plate comprises a stationary plate.

7. The battery of claim 1, wherein the second plate is a portion of the cell housing, such that the first plate moves relative to the cell housing.

8. The battery of claim 1, wherein the actuator comprises one or more shape memory alloy components.

9. The battery of claim 1, further comprising detents formed in at least one of the first and second plates for receiving the plurality of round members.

10. A fluid regulating system for regulating passage of a fluid into a battery cell, said fluid regulating system comprising:

a first plate disposed in fluid communication with the battery cell, said first plate having at least one plate aperture;

a second plate disposed adjacent to the first plate and having at least one plate aperture, said first and second plates forming a valve;

an actuator for moving the first plate relative to the second plate to open and close the valve to regulate the passage of fluid into the battery cell; and a friction reduction medium disposed between the first plate and the second plate, wherein the friction reduction medium comprises a plurality of round members, wherein the plurality of round members maintain a minimum separation distance between the first plate and the second plate and rotate during movement of the first plate relative to the second plate, and wherein the plurality of round members comprises spherical members each having a diameter of 1 to 200 microns.

11. The fluid regulating system of claim 10, wherein the friction reduction material further comprises a lubricating oil, wherein the plurality of round members are disposed within the lubricating oil.

12. The fluid regulating system of claim 11, wherein the lubricating oil comprises a low vapor pressure oil with a vapor pressure from $10^{-2}$ to $10^{-12}$ torrs.

13. The fluid regulating system of claim 10, wherein the lubricating material comprises spherical members of at least one percent by weight of the lubricating oil.

14. The fluid regulating system of claim 10, further comprising a frame supporting the first plate relative to the second plate.

15. The fluid regulating system of claim 10, wherein the first plate comprises a moving plate and the second plate comprises a stationary plate.

16. The fluid regulating system of claim 10, wherein the actuator comprises one or more shape memory alloy components.

17. The fluid regulating system of claim 10, wherein the plurality of round members each has a diameter in the range of 6 to 20 microns.

* * * * *